United States Patent
Yeo et al.

(10) Patent No.: US 7,408,707 B2
(45) Date of Patent: Aug. 5, 2008

(54) MULTI-REGION LIGHT SCATTERING ELEMENT

(75) Inventors: Terence E. Yeo, Boston, MA (US); Zane A. Coleman, Chicago, IL (US)

(73) Assignee: Fusion Optix Inc., Cambridge, MA (US)

( * ) Notice: Subject to any disclaimer, the term of this patent is extended or adjusted under 35 U.S.C. 154(b) by 291 days.

(21) Appl. No.: 11/197,246

(22) Filed: Aug. 4, 2005

(65) Prior Publication Data

US 2006/0056021 A1    Mar. 16, 2006

Related U.S. Application Data

(60) Provisional application No. 60/598,826, filed on Aug. 4, 2004.

(51) Int. Cl.
G03B 21/60 (2006.01)
G03B 21/56 (2006.01)
G02F 1/1335 (2006.01)
G02F 1/1333 (2006.01)
G02F 1/00 (2006.01)
H04N 5/74 (2006.01)
F21V 7/04 (2006.01)

(52) U.S. Cl. .................. 359/452; 359/455; 359/457; 359/460; 349/95; 349/96; 349/86; 348/771; 348/E13.035; 348/E5.142; 362/612

(58) Field of Classification Search .................. 359/452, 359/443, 453–457, 460; 349/84, 95–96, 349/86; 348/771, 266, E13.035, E5.142; 362/612

See application file for complete search history.

(56) References Cited

U.S. PATENT DOCUMENTS

| | | | | |
|---|---|---|---|---|
| 5,867,316 A | * | 2/1999 | Carlson et al. | 359/500 |
| 6,239,907 B1 | * | 5/2001 | Allen et al. | 359/443 |
| 6,381,068 B1 | | 4/2002 | Harada et al. | 359/443 |
| 2002/0109915 A1 | | 8/2002 | Mori et al. | 359/455 |
| 2004/0071417 A1 | | 4/2004 | Veligdan | 385/120 |
| 2004/0080821 A1 | | 4/2004 | Yamaguchi et al. | 359/543 |

FOREIGN PATENT DOCUMENTS

EP    0 732 615 A1    9/1996
EP    1 411 732 A2    4/2004

OTHER PUBLICATIONS

Patent Abstracts of Japan for JP 2001 228547 A (Matsushita Electric Ind. Co. Ltd.), vol. 2000, No. 25 (2001).
International Search Report for PCT/US2005/027589, mailed Dec. 2, 2005.

* cited by examiner

*Primary Examiner*—Diane I. Lee
*Assistant Examiner*—Magda Cruz

(57) ABSTRACT

A multi-region light scattering element with the optical characteristics of low speckle, high resolution high contrast, and high gain when used as an imaging element without any resulting loss of transmission or brightness with viewing angle. The multi-region light scattering element contains at least one region asymmetrically shaped light scattering features that are separated from a second light scattering region by a non-scattering region. In one embodiment, one or more of the regions contains particles that are asymmetrically shaped that improve the optical performance. In one embodiment, asymmetric particles are located in two regions separated by a non-scattering region with the particles within each region substantially aligned along an axis and the two axes are substantially perpendicular to each other. Methods for production of the screen element are also described.

27 Claims, 8 Drawing Sheets

MULTI-REGION LIGHT SCATTERING ELEMENT

RELATED APPLICATIONS

This application claims the benefit of priority under 35 U.S.C. 119(e) to pending U.S. Provisional Application No. 60/598,826, filed on Aug. 4, 2004 the entire contents of which is incorporated herein by reference.

FIELD OF THE INVENTION

The invention generally relates to the design of a light scattering element, and methods of manufacture, and more specifically its use in a screen assembly for a rear projection display system, such as those used in televisions, computers, home theatres, information displays and simulation systems.

BACKGROUND OF THE INVENTION

Traditional light scattering elements such as those used in projection screens have progressed over the years with the current designs still suffering from design tradeoffs. Some of the key merits for describing a projection screen include, gain, angle of view, resolution, transmission, screen contrast, speckle contrast, and cost. The ideal projection screen for typical applications should have the following merits:

- tailored viewing angles in the horizontal and vertical directions, so that the image may be seen from many directions;
- high gain, to increase the image brightness, improve contrast, and reduce lamp requirements;
- high resolution, such that high resolution images may be projected and displayed with full detail on the screen;
- high optical transmission (high optical efficiency) for the light incident on the screen, such that the projection system has reduced lamp requirements or a brighter display;
- high image contrast, where light from within the projection system or the ambient surroundings has a low or negligible impact on the perceived image contrast on the screen;
- low speckle contrast, allowing the use of smaller filament thus higher coherence length light sources to achieve higher optical efficiency in the projection system; and
- low manufacturing cost.

The underlying mechanism by which projection screens work relies on a material which can scatter the projected image into the viewer's eye to produce what is called a real image. Each pixel on the screen effectively acts as a point source of light, and all together they produce the images we see. A surface, such as a projection screen, that scatters the light in all directions so the intensity follows the cosine of the angle and the screen brightness (luminance) is constant over the range of angles, is termed a "Lambertian Surface." Thus, the brightness of a Lambertian screen appears constant, independent of the viewing angle. Projection screens are typically designed to scatter light more in the commonly viewed directions in order to increase the screen luminance in those directions to reduce constraints on the light source. In typical viewing situations, it is not necessary to project the image to the ceiling nor to the floor, since it is unlikely that a viewer will be in those positions. In principle, the brightness of an image on a projection screen from any particular viewpoint can be increased by having the screen preferentially direct light towards those viewing regions rather than scattering light equally in all directions. Therefore, if one could take all the light that would otherwise be wasted in non-viewing regions and re-direct it to the viewing region, i.e., in front of the screen at eye level, this would make the viewing region have a much higher luminance since the extra light is directed there at the expense of the non-viewing region. The increase in luminance relative to that of a perfect Lambertian surface is termed "gain". Thus, a 2× gain screen has a luminance that is twice that of a Lambertian screen for a given angle (typically measured at an angle normal to the surface). For a non-Lambertian projection screen, the extent to which it can be viewed in the horizontal and vertical planes is described in terms of angle of view (AOV) which is typically measured as the full angular width at half the maximum of the luminance curve (FWHM).

Early projection screens were made using ground glass diffusers. Later, technology evolved to the use of particle-containing sheet polymers to diffuse the light uniformly, resulting in—potentially—high gain screens, where the AOV could be as large as desired and controllable by adding more particles to the polymer. These screens suffered a major drawback due to the loss in contrast due to the backscatter of ambient light. Over the years, several methods for increasing the contrast have been developed, including adding tint to a medium between or within the diffuser and the viewer. This increases the contrast, since the ambient light that is scattered back (i.e., "backscatter") toward the viewer has passed through this tinted region twice and is significantly reduced in intensity relative to the light from the projection engine that has only passed through the tinted region once. Other methods for increasing display contrast in ambient light settings include focusing light by using lenticular lenses, beads, or reflecting surfaces (e.g., total internal reflection screens) through transparent apertures in-between light absorbing regions. By focusing the light through small holes, lines, or apertures, the fill factor for the black apertures can be very high, thus absorbing a significant amount of ambient light while passing the light from the projection engine. (These and other contrast enhancement methods are explained in "Projection Displays," Stupp and Brennesholtz, John Wiley & Sons, 1999, pp. 153-175, incorporated herein by reference.) However, with the industry moving to higher resolution HDTV displays and higher resolution monitors, the requirement for the feature sizes of the reflective or refractive methods such as beaded screens or lenticular screens has become more difficult and more costly. With lenticular lens pitches now at less than 100 µm, the cost and complexity of manufacturing are becoming larger issues. With higher resolutions bead screens, the size of the beads needed has also been reduced and the cost and size tolerance required has also increased.

The demand for higher resolution displays has also increased the visibility of speckle. "Speckle" is the optical interference effect resulting from the interference of light rays emerging from a scattering element—such as a screen—that are mutually coherent. The viewers' eye integrates this optical effect and sees a visible pattern. Speckle is typically measured by looking at the variation in intensity across a uniformly illuminated screen. "Speckle contrast" is defined as the ratio of the standard deviation of the intensity to the average intensity. A projection system with "high" speckle contrast means that the speckle pattern is more visible than a system with "low" speckle contrast.

Historically, speckle has not been a problem in low resolution displays. With low resolution displays, if a high coherence length source is used, one can use thicker scattering elements or two scattering regions spaced apart by a non-scattering region in order to reduce the speckle without reducing the resolution to unacceptable levels. More recently, manufacturers have begun using small filament (or arc) light sources to improve optical efficiency and the resolutions of the displays have increased significantly. However, small arc light sources increase the coherence length and when these are combined with many high resolution projection sources, the resulting image quality suffers from speckle (or scintillation). It is expected that in the future, the manufacturers will continue to reduce the lamp filament size to increase the optical efficiency and that the projection display resolution will continue to increase, thus speckle will become more of a problem. With laser-based systems, speckle contrast is even higher than that with incoherent or partially coherent light sources. Projection screen materials using a single layer of a scattering element have a tradeoff of speckle versus resolution. A thick single layer reduces the appearance of speckle, but lowers the resolution of the screen. A single thin scattering layer has a high resolution, but speckle is more visible. Two scattering regions spaced apart can reduce the speckle contrast, but also typically decreases the resolution. The effect of the speckle and resolution tradeoff is discussed by Stupp et al., and also in Goldenberg et al., "Rear Projection Screens for Light Valve Projection Systems," SPIE Vol. 3013, 1997, pp. 49-59, incorporated herein by reference. In "Rear Projection Screens for Light Valve Projection Systems," Goldenberg, et. al., SPIE Proceedings, Vol. 3013, 1997 discusses the use of a thick bulk diffuser or scattering elements spaced apart, the conclusion is that using these techniques will reduce the speckle contrast while also reducing the resolution. As a result, manufacturers have simply added spherical particles or surface relief to one of the elements, such as the Fresnel lens or lenticular lens, to add a small amount of diffusion to reduce speckle. This causes a significant decrease in resolution. When diffusive qualities are added to the optical system before contrast enhancing spatial filtering apertures (e.g., a transparent stripe in a black stripe lenticular screen), less of the light is focused through the aperture by the lenses. This reduces the optical efficiency of the system. For example, in a Fresnel lens, lenticular lens, or transparent-black stripe region diffuser screen configuration, addition of particles to the Fresnel or lenticular lens causes less of the light to be focused through the apertures, because the lenticular lens can not focus many of these oblique rays through the clear apertures. Lenticular lenses are typically designed to work with substantially collimated light from a Fresnel lens. Adding the spherical particles to the Fresnel lens, lenticular lens, or other region to reduce speckle in high resolution displays is a tradeoff relative to the reduction in optical efficiency and the added high cost of the particles.

When symmetric scattering particles are added in a region on the viewer side of the contrast enhancing features, the backscatter is increased, usually resulting in reduced contrast.

Screens that use more than one scattering layer typically use optical adhesives to combine the screen components; or, spherical light scattering particles are added to Fresnel lenses, lenticular lenses, substrates or other elements. This often introduces spurious interfacial reflections at the element interfaces, that reduces the contrast of the screen and adds to the production cost. When the interfaces are slanted or curved, such as the case with Fresnel lenses or lenticular lenses, respectively, the spurious reflections are more significant, and reduces the optical efficiency, and, possibly, reduce image contrast. For instance, a small amount of spherical particles added to a Fresnel lens to reduce speckle contrast can cause a significant amount of the scattered light to totally internal reflect within the Fresnel lens because of the large slant angles on the features of the Fresnel lens. This reduces the speckle contrast at the expense of reducing image contrast and reducing optical efficiency by lowering the screen transmission.

Many commercial rear projection televisions have reduced horizontal and vertical viewing angles in order to reduce intensity requirements of the projection lamp. For example, some commercial rear projection televisions have wide horizontal FWHM (full-width half maximum) of 50 degrees and a more narrow vertical FWHM of 20 degrees. This allows for longer lasting or lower intensity lamps to be used, and also reduces the heat and electrical power consumption. These viewing angles are usually achieved as a benefit of using a lenticular lens with transparent-black striped region to increase the contrast. The lenticular lenses spread the light in the horizontal direction after focusing the light through transparent stripes in between opaque black stripes and onto a weakly scattering symmetric diffuser for the light scattering element. A weak diffuser (light scattering diffuser with small FWHM) typically has a high gain, but can also introduce speckle. The combination of the lenticular lens and the diffuser dictate the viewing angles (and resulting gain), and this restricts the design of the lenticular-black stripe system. Similar restrictions also occur in beaded and TIR-based systems such that the angles of view can not be adjusted independently of other elements in the system. Other systems with asymmetric viewing angles typically have high costs, reduced image contrast or high speckle contrast when applied to high resolution projection displays.

SUMMARY OF THE INVENTION

The present invention provides light scattering elements which allow for projection screens and the like having high image contrast, low speckle contrast, high gain, high transmission, low-cost, and high resolution, and which are capable of being viewed over a designed range of viewing angles without any resulting loss of transmission or brightness.

The light scattering element of the invention contains at least one region with asymmetrically shaped light scattering features, a second light scattering region, and a third, non-scattering, region separating the first and second. The first and second regions are desirably optically coupled to the third, e.g., to ensure that the intensity of light passing from one region to the other is not substantially reduced and maintain a high gain.

In one embodiment, more than one of the regions of the material contains asymmetrically shaped particles. For example, one particular embodiment includes asymmetric particles in first and second light scattering regions separated by a third, non-scattering region. The asymmetrically shaped particles within each region may all be axially aligned, e.g., one region having particles aligned in the x axis, and the other region having particles aligned in the y axis, or substantially perpendicular to each other. In one embodiment, substantially planar particles are also added to further reduce the speckle contrast.

Methods for production of the screen element are also encompassed in the present invention. One method for producing a multi-region light scattering element includes combining asymmetric light scattering particles within a first host matrix material to form a scattering material. A second non-scattering material (e.g., host matrix material only) is then co-extruded between successive layers of the scattering material. This creates alternating phase regions with scattering and non-scattering properties. This multi-region element may then be optically coupled with a substrate material that may contain a hardcoat, anti-glare surface, tint or other image enhancing or maintaining features. A thick region of material may be simultaneously extruded with these regions to provide a rigid support for the screen element.

In another embodiment of this invention, light scattering particles in a fluid first host matrix material and asymmetrically shaped particles in a fluid second host matrix material may be co-extruded with a third fluid second host matrix material (forming a non-scattering region) scattering particles by a non-scattering region. All of the regions may be desirably made with the same host matrix.

Another method for production of screen elements of the invention includes the successive coating of alternating scattering and non-scattering regions with at least one region containing asymmetric particles.

Another embodiment of the invention includes the addition of substantially planar particles in the non-scattering regions to increase the optical path length of the light passing through them, further reducing speckle contrast. In a further embodiment, these particles may be birefringent, so light polarization becomes randomized; this multi-region element may be combined with a substrate and a hardcoat to produce a projection screen suitable for use as a high resolution, high brightness rear projection display.

In another embodiment of this invention, the coated or co-extruded optical element may be stretched under controlled temperatures and tension to align the particles or impart asymmetry to them. These multi-region elements can be combined with a substrate material that may contain a hardcoat in order to provide screen rigidity and protection.

The invention will be understood further upon consideration of the following drawings, description and claims.

DETAILED DESCRIPTION OF THE INVENTION

Figure 1:
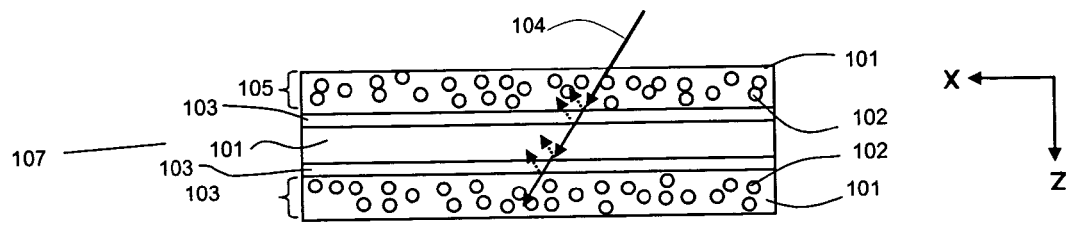
FIG. 1 is a schematic cross-sectional side view of an example of prior art multi-layer diffuser with adhesive between the layers.

The features and other details of the invention will now be more particularly described. It will be understood that particular embodiments described herein are shown by way of illustration and not as limitations of the invention. The principal features of this invention can be employed in various embodiments without departing from the scope of the invention. All parts and percentages are by weight unless otherwise specified.

Definitions

For convenience, certain terms used in the specification and examples are collected here.

"Speckle", often referred to also as scintillation, includes the optical interference pattern visible on a scattering element or perceived as coming from or near a scattering element. This can include color or intensity variations within an small area of interest.

"Speckle Contrast" is defined herein to include the ratio of the standard deviation of the intensity fluctuation to the mean intensity over the area of interest.

"Scatter," "Scattering," "Diffuse" and "Diffusing" as defined herein includes light scattering by reflection, refraction or diffraction from particles, surfaces, or layers.

"Optically coupled" is defined herein as including the coupling, attaching or adhering two or more regions or layers such that the intensity of light passing from one region to the other is not substantially reduced due to Fresnel interfacial reflection losses due to differences in refractive indices between the regions. Optical coupling methods include joining two regions having similar refractive indices, or by using an optical adhesive with a refractive index substantially near or in-between the regions or layers such as Optically Clear Adhesive 8161 from 3M (with a refractive index at 633 nm of 1.474). Examples of optically coupling include lamination using an index-matched optical adhesive such as a pressure sensitive adhesive; coating a region or layer onto another region or layer; extruding a region or layer onto another region or layer; or hot lamination using applied pressure to join two or more layers or regions that have substantially close refractive indices. A "substantially close" refractive index difference is about 0.5, 0.4, 0.3 or less, e.g., 0.2 or 0.1.

"Screen assembly" is defined herein as a single or combination of elements that can be components of a rear projection screen or alternatively an assembly suitable as a rear projection screen without the need for additional elements.

"Hardcoating" or "Hardcoat" is a coating applied to a surface of a screen element that hardens the surface of the screen element, thus reducing the appearance of scratches and protecting the screen element. Hardcoats can include anti-glare or surface relief characteristics or they can be coating onto surface relief structures providing anti-glare properties.

Screen resolution is defined as the smallest perceivable detail in an image. It is typically measured by projecting a pattern of alternating bright and dark lines on a projection screen and measuring the intensity of the image as described in VESA FPDM standard 303-7. From the intensity scan in the horizontal or vertical direction, the modulation depth of the intensity can be calculated for various line pairs per millimeter of the original pattern or image. The key resolution parameter is often defined as the highest number of lines per millimeter with an intensity modulation depth of 20% (as defined by Goldenberg et. al.). The independent performance of a projection screen is measured with a very high contrast pattern without using the projection engine of the screen in order to ascertain the screen's performance. The curve of contrast modulation versus line pairs per millimeter illustrates the resolution of the screen graphically. For example, a 55 inch 1080p High-Definition projection TV has a resolution of approximately 3.15 line pairs per millimeter. A similar 40 inch projection TV has a resolution of 4.34 line pairs per millimeter.

The "Gain" of a screen or light scattering element is the ratio of the maximum luminance of an illuminated light transmitting material in a given direction relative to the luminance of a theoretically perfect diffuser in the same direction. To measure the gain of a particular sheet of material, a known amount of light is directed to the sheet, and the maximum luminance is measured using a standard luminance meter. The maximum luminance of light measured is then compared to a theoretically "perfect" diffusive material.

The gain for an imperfect diffuser is the value of the maximum intensity (ML) divided by the value of the luminance of the theoretically perfect diffuser. For a theoretically perfect transmissive Lambertian diffuser material, providing one foot-candle (10.76 lumen/$m^{2)}$ of illumination to the material results in the luminance of one footlambert at all angles. Therefore, if the maximum intensity of luminance transmitted by a material is equal to one footlambert, its gain with respect to a theoretical diffuser is 1.0 for that angle of transmission. For imperfect diffusers the gain will be maximum (ML) and larger than 1 for a given viewing direction (typically measured orthogonal to the plane of the diffuser).

Thus a high gain screen will typically be brighter when viewed orthogonal to the plane than at other angles. Because the light transmitted by the material can never be more than the amount of light supplied, less light must be transmitted at angles other than the angle of maximum intensity.

"Angle of view" (AOV) is a measurement of luminance for all angles relative to two perpendicular axes in the plane of the material. These are called the X axis or the horizontal axis, and the Y axis or the vertical axis. The angle of view is measured by applying a "full-width at half maximum" approach, a "full-width at one-third maximum" approach, and a "full-width at one-tenth maximum approach." The AOV at full-width at half maximum ($\alpha(\frac{1}{2})$) is calculated from sum of the absolute value of the angles (measured from an orthogonal to the plane of the material) at which the luminance at one-half the maximum luminance is measured and noted. For example, if angles of +35° and −35° were measured to have one-half of the maximum luminance in the horizontal direction, the AOV $\alpha(\frac{1}{2})$ in the horizontal direction for the screen would be 70°. The AOV at full-width at one-third maximum ($\beta(\frac{1}{3})$) and the AOV at full-width at one-tenth maximum ($\chi(\frac{1}{10})$) are calculated similarly, except that they are calculated from the angles at which the luminance is one-third and one-tenth of the maximum light intensity respectively.

The "asymmetry ratio" is the horizontal AOV $\alpha(\frac{1}{2})$ divided by the vertical AOV $\alpha(\frac{1}{2})$, and thus is a measure of the degree of asymmetry between the horizontal luminance and the vertical luminance of the diffuser.

A "spheroidal" or "symmetric" particle includes those substantially resembling a sphere. A spheroidal particle may contain surface incongruities and irregularities but has a generally circular cross-section in substantially all directions. A spheroid is a type of ellipsoid wherein two of the 3 axes are equal. An "asymmetric" particle is referred to here as an "ellipsoidal" particle wherein each of the three axis can be a different length. Typically, ellipsoidal particles resemble squashed or stretched spheres.

The present invention relates to multi-region light scattering elements that, when used as imaging elements, have low speckle but improved resolution over those previously attainable. By using asymmetric particles in at least one of at least two light scattering regions of an imaging element and separating the two by a substantially non-scattering region, the traditional tradeoff constraints between speckle and screen resolution are reduced. The resulting light scattering element can have a high resolution with low speckle contrast, high gain and improved image contrast. One particularly useful embodiment of this invention uses the light scattering element of the invention as a screen element for a rear projection display system.

It is known that speckle contrast can be reduced by using two symmetric diffusers spaced apart from each other by a non-scattering region. FIG. 1 illustrates a prior art example of the speckle resulting from two symmetric light scattering layers separated by a non-scattering layer. Two light scattering layers 105 and 106 (composed of a host matrix 101 with dispersed spherical particles 102) separated by a non-scattering layer 101 to which they are adhered to using an adhesive 103. When light rays 104 from the same source are directed toward the light multi-layer symmetric light scattering material 107, a speckle pattern occurs if the interference is destructive and constructive in neighboring regions, creating a high contrast speckle pattern. The coherence effect is related to the optical path length differences between two or more rays impinging on one surface.

In high resolution projection systems, the light is substantially collimated, and light rays in close proximity to each other on a scattering surface have traveled essentially the same optical path. If this path length difference is less than the coherence length of the projection engine, then constructive and destructive interference occurs in that light scattering region. With substantially one scattering surface, a viewers' eye will integrate the intensity pattern and will see a speckle pattern near the scattering surface. By using more than one diffuser, the speckle contrast is reduced because the speckle pattern formed from the first scattering surface is effectively averaged by the second surface since light from different angles impinges on the second surface creating multiple, overlapping speckle patterns. But reducing speckle in this manner has always resulted in decreased resolution and/or gain.

Figure 2:
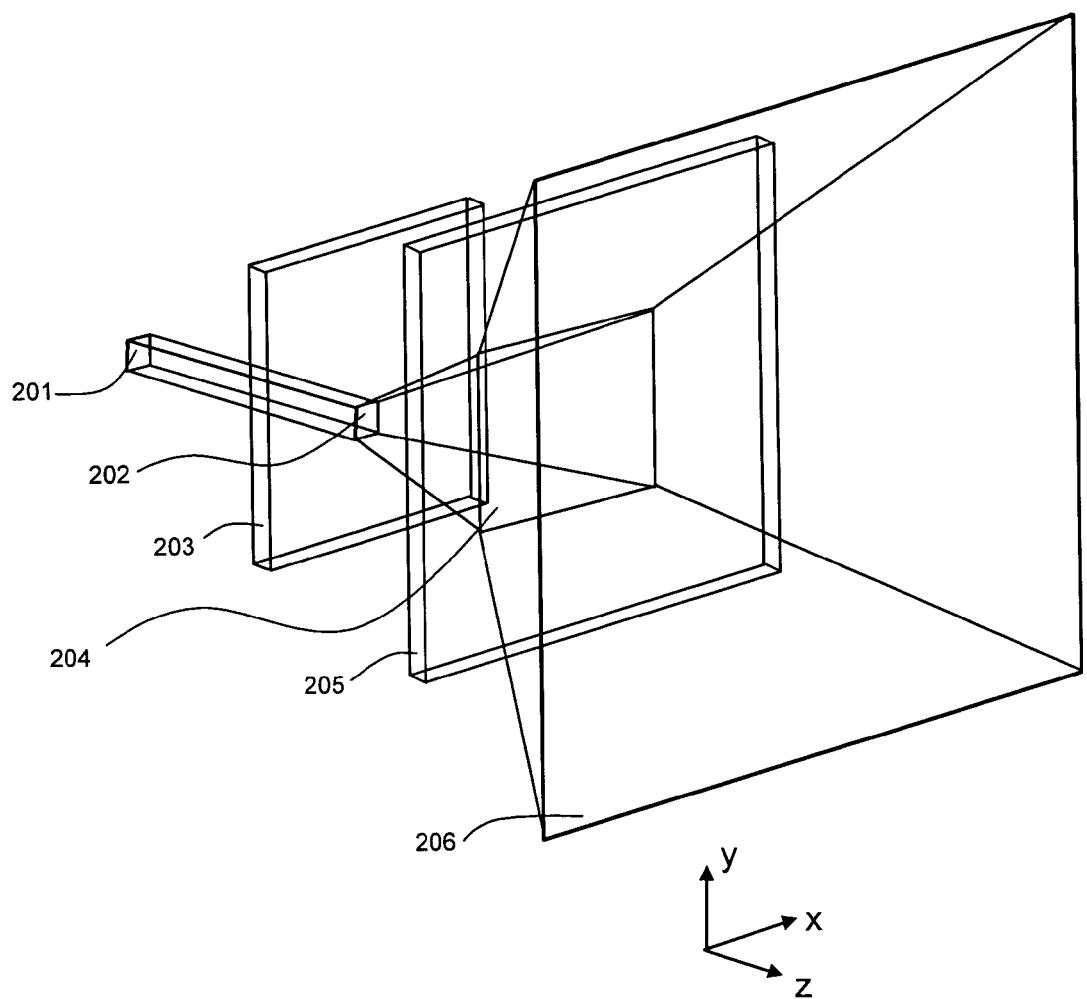
FIG. 2 is a perspective view of the prior art illustrating the symmetric diffusion effect on pixel resolution when of one embodiment of a multi-phase screen element wherein light scattering regions are separated by a non-scattering region of the same host matrix material.

The resolution of a screen which uses multiple thin symmetric light scattering elements or a thick symmetric light scattering element (i.e., to reduce speckle) is decreased relative to using a single thin symmetric light scattering element. This is illustrated in FIG. 2, showing the prior art, where the visible region corresponding to a display pixel is effectively enlarged when it passes through two diffusers. In this example, substantially collimated light 201 from a projection engine is incident on the first symmetrical diffuser 203 at a region 202. The light in the region corresponding to the pixel is spread into larger angles. This light then becomes incident on a second diffuser 204 in a region larger in the x and y directions which further scatters the light from substantially every point of incidence into a second range of angles 205 which increases the flux of the light rays in the horizontal and vertical angles further from the normal to the display 206. This process continues in systems with more than two scattering elements.

Projection screens having a surface relief matte surface introduce their own issues. The matte surface on the substrate of typical projection screens is usually a very weak diffuser with large features relative to any other scattering elements present. The matte surface typically has a minimal effect on the speckle contrast since it is typically a weakly scattering surface. The amount of light distribution depends on the strength of the scattering elements and as a result, the apparent pixel size and location also depends on the strength of the scattering elements when more than one is used. For example, in a rear projection display screen that has a low concentration of particles in a Fresnel lens and a larger concentration of particles in a strongly scattering substrate, followed by a weakly scattering matte surface, the apparent location of the image will be on the strongly scattering substrate. Some light will be scattered by the matte surface; however, a weakly scattering matte surface has a minimal amount of scattering, so the perceived plane of the image will be at the strongly scattering substrate. This effect can be seen by "looking through" a weak diffuser film at an extended light source such as a fluorescent light fixture. The viewers' eye will try to focus on the light fixture through the weak diffuser, and not try to focus on the film directly. In the case of the projection display just described, the viewer will essentially be looking through the matte surface to try to focus on the strongly scattering element. However, since projection systems are typically used for large screen displays that are viewed from a distance, a viewer from a long distance relative to the spacing between the scattering elements would not be able to distinguish the difference between the two or more effective image planes when "looking through" a matte surface. The location of the apparent speckle pattern is affected similarly. The eye will try to ascertain the image (or speckle pattern) location and in some cases, the perceived location may be on a scattering element, in between scattering elements or within a scattering element.

Light scattering screens that offer improved gain include volumetric, asymmetrically scattering elements such as discussed in U.S. Pat. No. 5,932,342, incorporated herein by reference. These screens may be used in projection applications, but the main benefits are the increased control of achieving the desired total viewing angle with one layer, e.g., without having to resort to using lenticular lenses; and high gain. But often these diffusers need to be thick (near 250 µm in some cases) to achieve the necessary wide horizontal viewing angles (e.g., 30° by 50°) and the complicated production methods to make them have limited their use in the marketplace. Low gain symmetric diffusers scatter light into large angles and these are typically very thick and reduce the resolution of the projection system. High gain symmetric diffusers, on the other hand, scatter only a very small portion of the incident light into larger angles but the path length difference of the light rays in proximity in the scattering region is very small, so these screens typically have high speckle contrast, ruling them out from use in high resolution projection systems.

The present invention addresses the problem of reducing speckle contrast in optical elements from which projection screens may be made, without having to sacrifice gain or resolution. Another way of describing the solution presented here is that one can achieve a high resolution, high gain optical element without significantly increasing the speckle contrast. By examining the effect of scattering elements on resolution along two axes, such as the horizontal and the vertical, and designing the light scattering elements to preferentially scatter along those axes, one can achieve a higher resolution for the spaced apart light scattering elements compared to symmetric diffusers.

Figure 3:
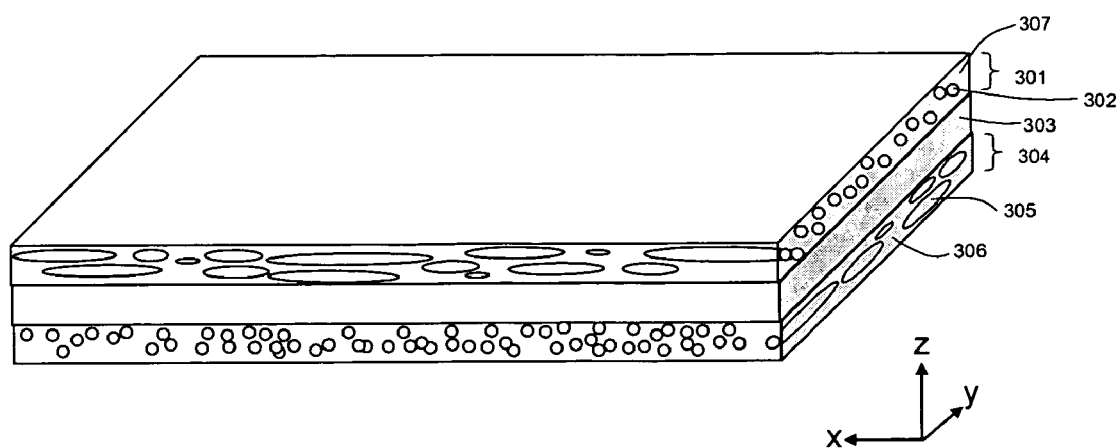
FIG. 3 is a perspective view of one embodiment of a multi-region light scattering element of the invention, containing two regions with asymmetric particles axially aligned perpendicular to each other, separated and optically coupled to a non-scattering region.

FIG. 3 illustrates one embodiment of this invention where two asymmetric light scattering regions 301 and 304 are aligned perpendicular to each other and separated by a non-scattering region 303. A host matrix material 307 having a refractive index $n_{h1}$ contains asymmetric light scattering particles 302 with refractive index $n_{p1}$. The particles within each scattering region are axially aligned in substantially the same way, and the respective axes of the respective scattering regions are oriented are perpendicular to one another. The asymmetrical shape of the particles scatters light so that more light can be directed into the horizontal, vertical or other desired direction.

Compared to pair of conventional symmetric diffusers similarly spaced apart, the multi-region asymmetric light scattering element of FIG. 3 significantly increases the screen resolution with similar or reduced speckle contrast. The effect of the element of FIG. 3 is demonstrated in FIG. 4, where it is seen that collimated light 401 from a projector corresponding to a pixel is incident on an area 402 of a first asymmetrically scattering region 403 and is diffused in a controlled fashion in the x-z plane. The light travels a distance between the two light scattering regions and is incident on an area 405 on the second asymmetric light scattering region 404. This light is asymmetrically scattered in the y-z plane. By separating out the scattering in the horizontal (x-z) and vertical (y-z) planes, the light is effectively diffused into the desired horizontal and vertical viewing directions 406; importantly however, the resolution has not been reduced because the pixel has not been diffused twice in the same viewing direction as is the case in the prior art example shown in FIG. 2.

Figure 20:
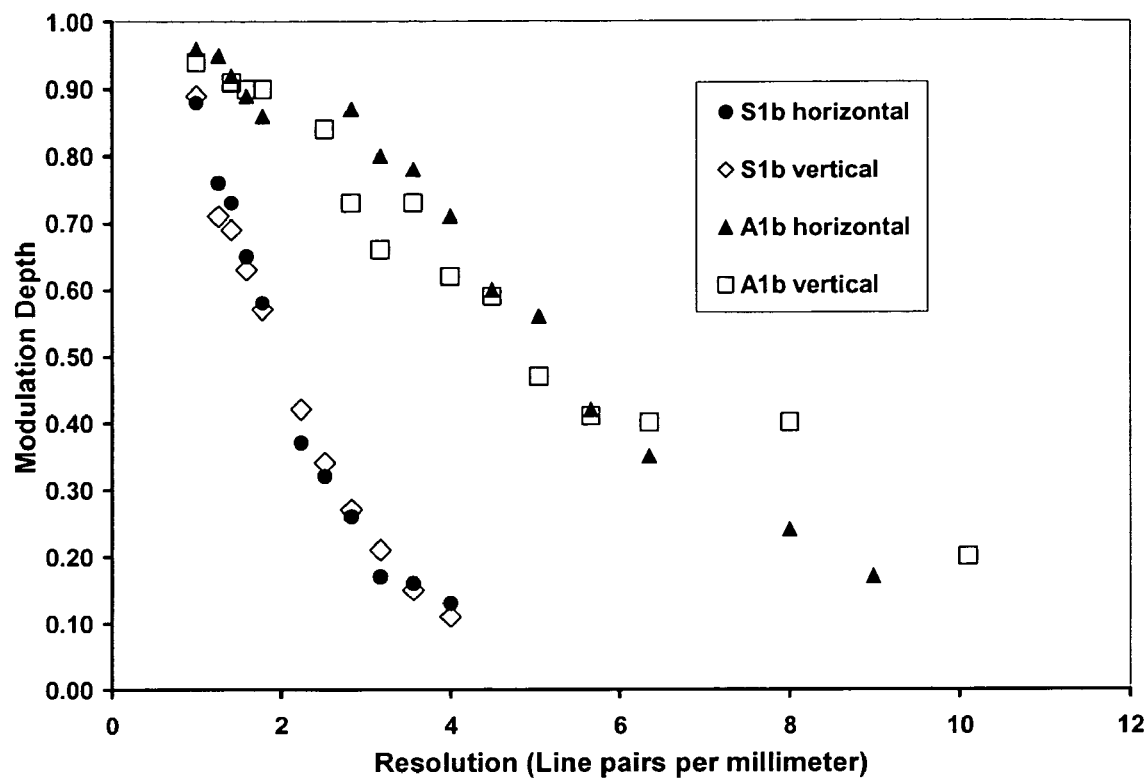
FIG. 20 is a chart illustrating the resolution performance for the first symmetric and crossed asymmetric samples.
Figure 21:
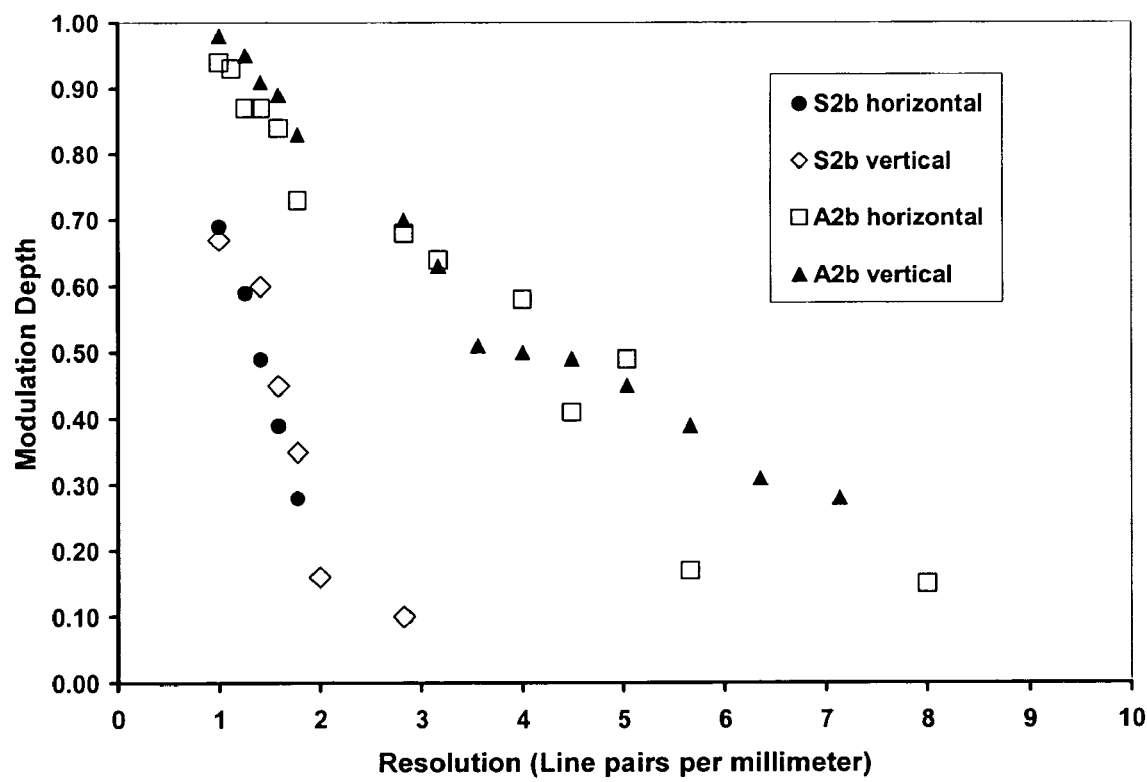
FIG. 21 is a chart illustrating the resolution performance for the second symmetric and crossed asymmetric samples.

FIGS. 20 and 21 illustrate the increased resolution achieved by using a multi-region light scattering element with asymmetric light scattering features instead of a multilayer symmetric diffuser. The elements composed of symmetric diffusers (shown in the figures as "S1" and "S2") was made by laminating two symmetric diffusers on opposite sides of a transparent polycarbonate substrate. The element with asymmetric diffusers (shown in the figures as "A1" and "A2") was made by laminating two asymmetric diffusers on opposite sides of a transparent polycarbonate substrate such that their major axes of diffusion were crossed. The resulting FWHM diffusion angles of both elements were equivalent, but the resolution of the element containing asymmetric light scattering features was approximately three times higher in the horizontal and vertical directions.

In one embodiment, the asymmetric light scattering elements are composed of a matrix material that is preferably durable, stable, and allows optical coupling to other materials, such as a hardcoat, an anti-reflective coating, or a contrast enhancement layer. Suitable matrix materials include acrylics, such as polymethylmethacrylates; polyesters; polystyrenes; polyolefins, such as polyethylenes, polypropylenes, and their copolymers; polyamides; organic acid cellulose esters, such as cellulose acetate butyrates, cellulose acetates, and cellulose acetate propionates; and polycarbonates. The matrix may also include compatibilizers to improve the processing and performance of the material. In a preferred embodiment Spectar 14471 copolyester from Eastman Chemical Company may be used.

Types of asymmetric light scattering features, regions or elements used in the invention include volumetric and surface relief. Surface relief and volumetric asymmetric light scattering elements can be combined in one or more scattering regions. "Asymmetric light scattering surfaces" include diffractive structures, refractive structures, and reflective structures in small or high frequencies or modulations. One or more characteristics of the surface patterns or features may be regular, random, or partially random. Surface relief structures herein include those that refract, diffract, scatter, diffuse, reflect or otherwise alter the direction, angular extent or divergence of incident light, independently of how they are made. For example, surface features recorded holographically and then stamped or embossed into a surface are included as surface relief structures. Undulations on the surface of a material due to exposure to radiation that ablates material or alters the physical, chemical, or optical properties are also deemed surface relief structures. Surface relief structures are typically on a surface of a material exposed to air, although when they are embedded within a medium, they can effectively create a volumetric, asymmetric light scattering region.

Volumetric, asymmetric light scattering elements include asymmetrically shaped particles within a host matrix material, graded-refractive index (GRIN) lenses or regions, physically, holographically or optically formed asymmetric regions. The light scattering features within the bulk volume of material may vary in size, shape, concentration, and composition, providing that the refractive index within the volume of the material varies in at least one of the x, y, or z directions sufficiently to asymmetrically scatter incident light. Example of asymmetric, volumetric scattering materials include stretched asymmetric particles in a host matrix material, radiation exposed photopolymers that enable refractive index variations, asymmetrically shaped voids or regions of materials or elements that differ in refractive index of the host matrix material, and embedded surface relief features.

The thickness of one or more of the volumetric asymmetric light scattering regions affects the resolution and the speckle contrast. In one embodiment, the thickness of one or more of the asymmetric light scattering regions is less than 10 mm. In another embodiment, the thickness may be less than 9, 8, 7, 6 or 5 mm. In another embodiment, the thickness may be less than 3 mm. In a more preferred embodiment, the thickness of one or more of the asymmetric light scattering regions is less than 2 or 1 mm.

Asymmetric particles can be added to the multi-region light scattering element or they can be created during manufacturing in order to obtain one or more regions with asymmetric light scattering characteristics. In one embodiment of this invention, a multi-region light scattering element is created when particles not substantially asymmetric in shape may be stretched along an axis after coating or during or after an extruding process such that they become asymmetric in shape. Other methods for achieving a single region of asymmetric particles in a region are disclosed in U.S. Pat. No. 5,932,342, the text of which is incorporated herein by reference. By using multiple layers or multi-region methods such as co-extrusion, optical lamination, optical coupling, thermal bonding, multiple regions containing light scattering particles can be combined into a single light scattering element. The degree of stretching can control the asymmetry and thus achieve a desired level of asymmetric light scattering. The asymmetric particles may have a large variation in size depending on the desired level of asymmetry.

The asymmetric particles in at least one region of a multi-region light scattering element can be obtained by reducing particles in size in the x, y or other directions by stretching a film after extrusion. These particles have a refractive index $n_{p1}$ different from the host matrix material refractive index $n_{h1}$ defined by at least one of $|n_{hx1}-n_{px1}| \geqq 0.001$, $|n_{hy1}-n_{py1}| \geqq 0.004$, or $|n_{hz1}-n_{pz1}| \geqq 0.001$ such that sufficient light scattering for the desired viewing angle is achieved. In a preferred embodiment, the particles are located in more than one region with the regions spaced apart by a non-scattering region of the host matrix material.

The asymmetric features, e.g., particles, typically are all oriented with their major axes substantially in one direction parallel to the plane of the surface of the material. Desirably, the particles are made from a material which is capable of being deformed at a processing temperature in order to create their asymmetric or ellipsoidal shape by stretching. Particles such as glass beads or cross-linked acrylic beads are not suitable for this application because they can not be stretched at processing temperatures suitable for manufacturing. Further, the volume density of the particles, the average ellipsoidal particle minor axis size, and the index of refraction the ellipsoidal particles may be optimized to control the horizontal viewing angle and other desired properties of the material.

The average particle size of the particles in the matrix may be from about 1 µm to about 30 µm, preferably from about 2 µm to about 15 µm, and most preferably from about 2 µm to about 5 µm in the minor dimension.

The differential refractive index ($\Delta n_{ME}$) defined as the absolute value of the difference between the index of refraction of the matrix ($n_M$) and the index of refraction of the ellipsoidal particles ($n_E$), or $|n_M-n_E|$, may be from about 0.005 to about 0.2, and preferably is from about 0.007 to about 0.1.

Suitable materials for the particles include acrylics such as polymethylacrylates; polystyrenes; polyethylenes; polypropylenes; organic acid cellulose esters such as cellulose acetate butyrates, cellulose acetates, and cellulose acetate propionates; polycarbonates; silicones; or glass spheres. The particles may also contain coatings of higher or lower refractive index materials, or they may be hollow materials containing a gas mixture such as air. In a preferred embodiment, polyethylene may be used.

The differential refractive index ($\Delta n_{MS}$) defined as the absolute value of the difference between the index of refraction of the matrix ($n_M$) and the index of refraction of the particles ($n_S$), or $|n_M-n_S|$, may be from about 0.005 to about 0.2, and preferably is from about 0.007 to about 0.1.

The multi-region element of the invention may also include an optional hardcoat to increase the stability of the element, and/or an optional anti-reflective coating. The hardcoat may be any light-transmissive support layer, such as a siloxane-based polymer layer. Optionally, the hardcoat may include a tint, traditionally used to increase the contrast of the screen.

The material may also include an opaque grid contrast layer and/or a refractive lens or reflective element layer. The opaque grid is preferably black for maximum absorption of light and is designed to match the lens layer such that light is channeled by the lens layer into the grid. Alternatively, total internal reflection elements can be used to direct the light by reflection through the opaque grid. The opaque grid may be a layer adhered, laminated, or coated onto either the lens layer or the matrix with embedded ellipsoidal particles, and spheroidal particles. The grid may have regular, irregular, random, or semi-random shaped or frequency distribution of opaque and transparent regions. The lens layer may be a lenticular or microlens layer, or spherical beads refracting as lenses and the lenses are preferably packed close together so that the entirety of the surface of the lens layer is covered with the lens structures. The total internal reflection elements could be an array or pattern of reflective elements with the light transmitting through a high refractive index region and totally internally reflecting off of the low refractive index interface such that a significant portion of the incident light is directed through the opaque layer. The overall contrast of the material may be increased from about 10:1 to 100:1 by addition of an opaque grid contrast layer and a refractive lens/reflective element layer, collectively referred to as a "contrast enhancement layer" depending on the ambient light level and luminous output from the projector.

The multi-region scattering elements of the invention desirably will reduce the need for more expensive higher cost lamps when used in a projection system. In one embodiment, the optical gain of the multi-region light scattering element is larger than 1. In a more preferred embodiment, the optical gain of the multi-region light scattering element is larger than 2.

Typically, the horizontal spacing of the viewers' eyes would judge the depth of the image based on the diffusion in the horizontal plane because of the parallax needed to ascertain depth, although this could vary based on the strength of the diffusers. This would place the apparent image location at the first asymmetric diffuser shown in FIG. 4. If one were to view the screen up close, it is believed that the brain would integrate the light over the angles and that the image location would be located in-between the light source side of the first asymmetric diffuser and the viewer side surface of the second asymmetric diffuser depending on the diffusion angles of the diffusers. However, since the projection screens are typically viewed from a distance, the image planes are effectively co-planar due to the short spacing between the light scattering elements (typically less than 5 mm) relative to the long viewing distance (several meters).

Figure 4:
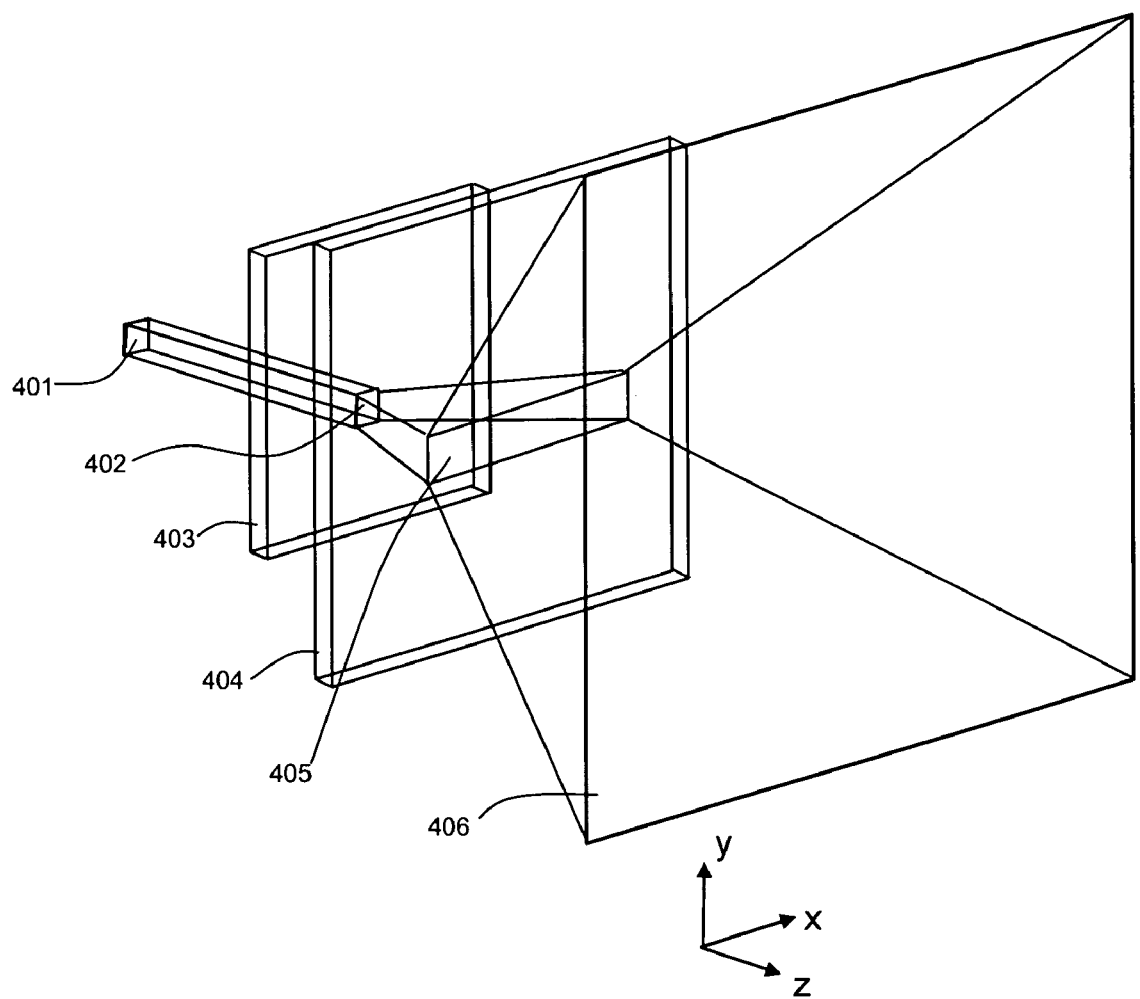
FIG. 4 is a perspective view of the asymmetric diffusion effect on pixel resolution of one embodiment of this invention where light is asymmetrically diffused in the x-z plane and subsequently in the y-z plane.

Since the light corresponding to the pixel in FIG. 4 is asymmetrically scattered in the horizontal plane by one element and scattered in the vertical plane by one element, the effective size of the pixel is not increased substantially. This effect can also be achieved by orienting the asymmetric diffusers substantially normal to each other but at an angle theta with respect to the horizontal or vertical axis. Since the viewing angle requirements for rectangular displays are often in the horizontal and vertical orientations, aligning the diffusers near these axes is preferred. In the case where Moiré or other optical artifacts (such as scintillation or color artifacts) could arise with respect to elements within the system such as the pixel pattern, the asymmetric light scattering elements can be oriented at an angle to the horizontal or vertical to help reduce the visibility of these artifacts. It is believed that a minor amount of scattering is needed in the weak axis of a very asymmetric diffuser in order for there to be some scattering at angles 45 degrees from the horizontal and vertical planes, such that the brightness at the corners of the display would be sufficient when the display is viewed from a location normal to the center of the screen.

Figure 5:
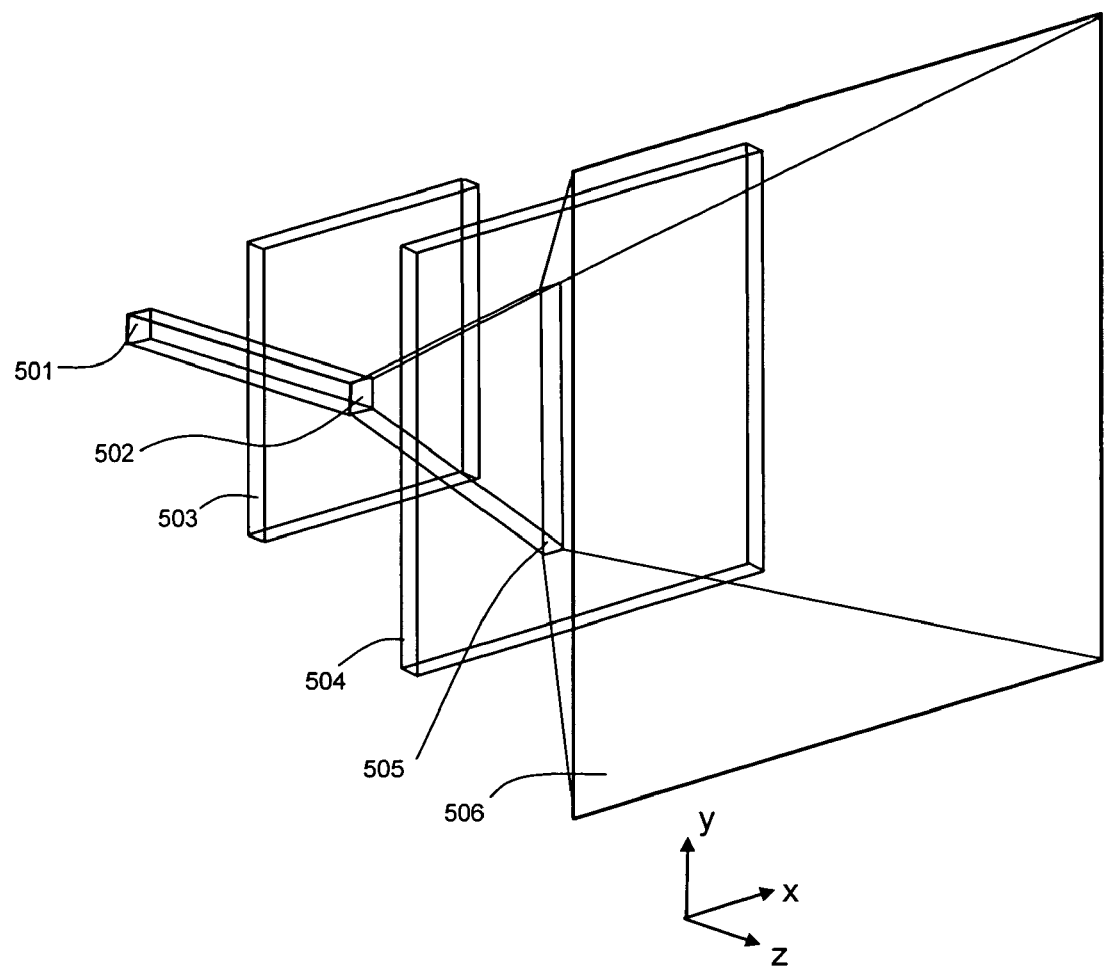
FIG. 5 is a perspective view of the asymmetric diffusion effect on pixel resolution of one embodiment of this invention where light is asymmetrically diffused in the y-z plane and subsequently in the x-z plane.

FIG. 5 illustrates an embodiment of the invention, where light from a projector corresponding to a pixel is asymmetrically diffused in the y-z plane and then asymmetrically diffused in the x-z plane. Collimated light 501 from a projector corresponding to a pixel is incident on an area 502 of a first asymmetrically scattering region 503 and is diffused in a controlled fashion in the y-z plane. The light travels a distance between the two light scattering regions and is incident on an area 505 on the second asymmetric light scattering region 504. This light is asymmetrically scattered in the x-z plane. By separating out the scattering in the horizontal (x-z) and vertical (y-z) planes, the light is effectively diffused in the desired horizontal and vertical viewing angles 506; importantly however, the apparent pixel size is not increased as much as in the case when using two symmetric diffusers as shown in FIG. 2

Figure 6:
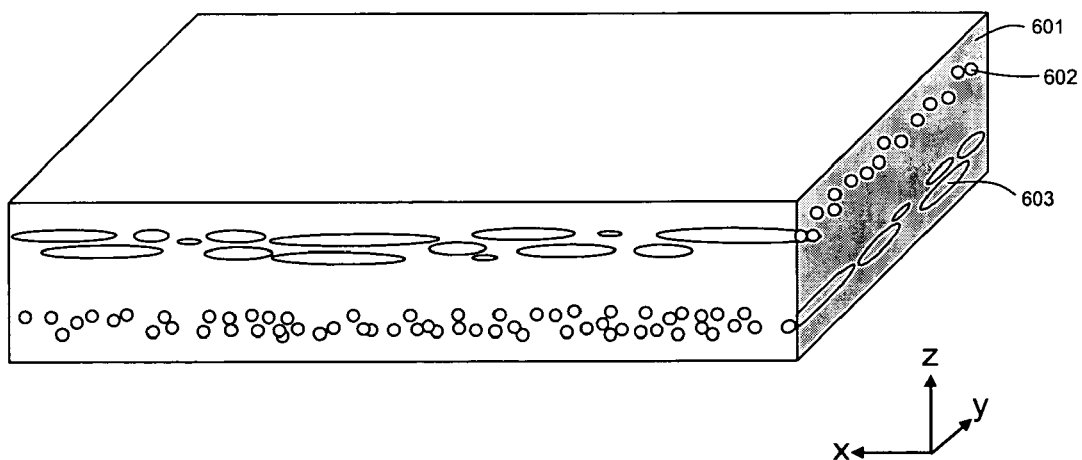
FIG. 6 is a perspective view of one embodiment of a multi-region light scattering element containing two regions with asymmetric particles aligned perpendicular to each other and spaced apart without interfaces between the regions.

FIG. 6 illustrates an embodiment where a host matrix material 601 having a refractive index $n_{h1}$ contains light scattering particles 602 and 603 having a refractive index $n_{p1}$. The first light scattering particles 602 are asymmetric with their major axis aligned substantially in the x direction within the regions and perpendicular to the alignment of the second light scattering particles 603 in the second region aligned with their major axis in the y axis direction. The asymmetric shape of the particles scatters light to direct it into the horizontal, vertical or other desired direction. In the embodiment illustrated in FIG. 6, there is no interface between the regions. The host matrix material is the same for the regions containing dispersed particles and the central region without particles. This reduces undesirable backscattering in the multi-region light scattering element due to reflections from the refractive index differences at the interfacial boundaries. The spacing between the regions reduces the speckle contrast. In a further embodiment, more than two asymmetric regions may be combined to achieve a desired viewing angle and optical performance such as combining asymmetric diffusers with following FWHM diffusion profiles: ten degrees by 2 degrees, 10 degrees by 2 degrees and a 4 degrees by 40 degrees. These could be separated by substantially non-scattering regions and two or more diffusers could be optically coupled together.

Figure 7:
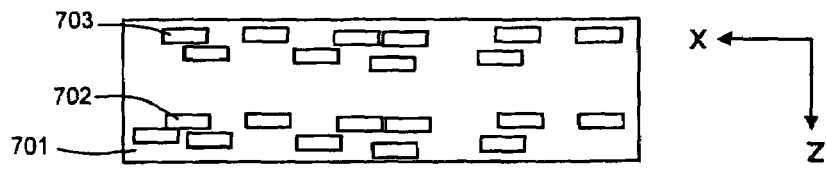
FIG. 7 is a schematic cross-sectional side view of one embodiment of a multi-region light scattering element wherein asymmetric light scattering regions are aligned and separated by a non-scattering region of the same host matrix material.

FIG. 7 illustrates a schematic cross-sectional diagram of another embodiment of an element containing asymmetric particles substantially aligned in the x direction in both regions. The host matrix material 701 having a refractive index $n_{h1}$ contains light scattering particles 702 and 703 having a refractive index $n_{p1}$. The first light scattering particles 702 are asymmetric, and aligned substantially in the x direction within the regions and parallel to the alignment of the second light scattering particles 703 in the second region also aligned in the x direction. The asymmetric shape of the particles scatters light to direct it into the horizontal, vertical or other desired direction. In the embodiment illustrated in FIG. 7, there is no interface between the regions. The host matrix material is the same for the regions containing dispersed particles and the central region without particles. This reduces undesirable backscattering in the multi-region light scattering element due to reflections from the refractive index differences at the interfacial boundaries. The spacing between the regions reduces the speckle contrast. In a further embodiment, more than two asymmetric regions may be combined to achieve a desired viewing angle and optical performance such as combining asymmetric diffusers with following FWHM diffusion profiles: ten degrees by 2 degrees, 10 degrees by 2 degrees and a 4 degrees by 40 degrees. These could be separated by substantially non-scattering regions and two or more diffusers could be optically coupled together.

Figure 8:
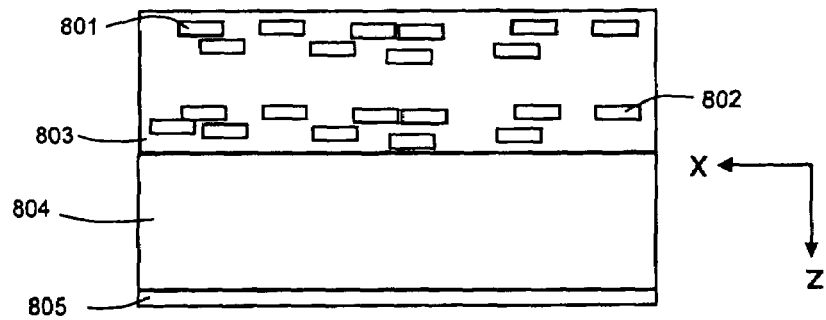
FIG. 8 is a schematic cross-sectional side view of one embodiment of a projection screen assembly comprised of a multi-region light scattering element with asymmetric particles substantially aligned and optically coupled to a substrate with a hardcoat.

FIG. 8 illustrates another embodiment, a projection screen assembly having two regions containing asymmetric light scattering particles substantially aligned in the x direction that are optically coupled to a substrate with a hardcoat. The host matrix material 803 having a refractive index $n_{h1}$ contains light scattering particles 801 and 802 having a refractive index $n_{p1}$. The first light scattering particles 801 are asymmetric, and aligned substantially in the x direction within the regions and parallel to the alignment of the second light scattering particles 802 in the second region also aligned in the x direction. A substrate 804 with a hardcoating 805 is optically coupled to the host matrix material 803. The asymmetric shape of the particles scatters light to direct it into the horizontal, vertical or other desired direction. In the embodiment illustrated in FIG. 8, there is no interface between the light scattering regions. The host matrix material is the same for the regions containing dispersed particles and the central region without particles. This reduces undesirable backscattering in the multi-region light scattering element due to reflections from the refractive index differences at the interfacial boundaries. The spacing between the regions reduces the speckle contrast. The asymmetrically shaped particles diffuse the light preferentially in the y-z plane which could be aligned horizontally in a rear projection television such that the screen provides reduced speckle and increased gain, higher image contrast, and higher optical efficiency. The substrate may be tinted, contain pigments, absorbing particles, or dyes and may be a co-extruded layer of the host matrix material or other material. It may have additional light scattering particles or features. The substrate may have surface relief features to provide anti-glare or anti-reflection coatings or features.

Figure 9:
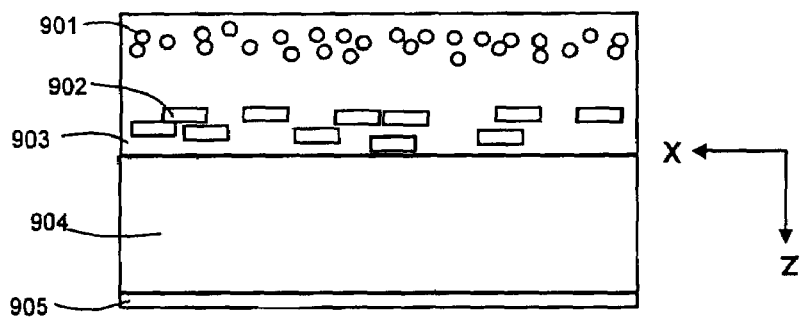
FIG. 9 is a schematic cross-sectional side view of one embodiment of a projection screen assembly comprised of a multi-region light scattering element with the substantially perpendicular asymmetric particles combined with a substrate and a hardcoat.

FIG. 9 illustrates an embodiment of this invention, a projection screen assembly where two regions containing asymmetric light scattering particles are separated by a non-scattering region. The host matrix material 903 having a refractive index $n_{h1}$ contains light scattering particles 901 and 902 having a refractive index $n_{p1}$. The first light scattering particles 901 are asymmetric, and aligned substantially in the y direction within the regions and perpendicular to the alignment of the second light scattering particles 902 in the second region aligned in the y direction. A substrate 904 with a hardcoating 905 is optically coupled to the host matrix material 903. The asymmetric shape of the particles scatters light to direct it into the horizontal, vertical or other desired direction. In the embodiment illustrated in FIG. 9, there is no interface between the light scattering regions. The host matrix material is the same for the regions containing dispersed particles and the central region without particles. This reduces undesirable backscattering in the multi-region light scattering element due to reflections from the refractive index differences at the interfacial boundaries. The spacing between the regions reduces the speckle contrast. The asymmetrically shaped particles diffuse the light preferentially in the y-z plane and x-z plane which could be aligned horizontally and vertically, respectively in a rear projection television such that the screen provides reduced speckle and increased gain, higher image contrast, and higher optical efficiency. The substrate may be tinted, contain pigments, absorbing particles, or dyes and may be a co-extruded layer of the host matrix material or other material. It may have additional light scattering particles or features. The substrate may have surface relief features to provide anti-glare or anti-reflection coatings or features.

Figure 10:
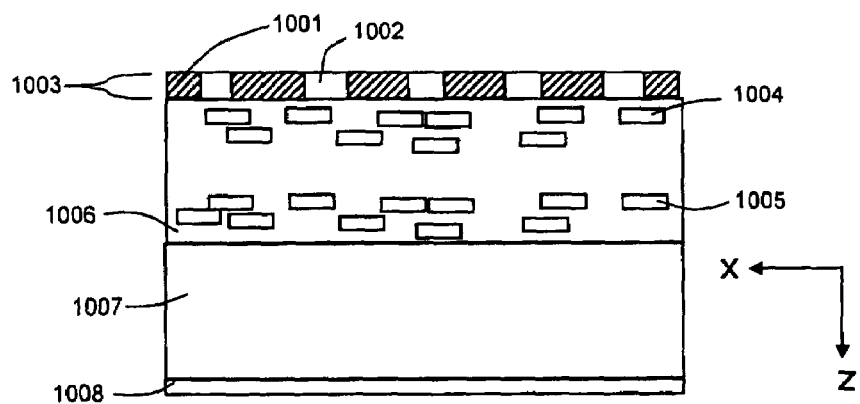
FIG. 10 is a schematic cross-sectional side view of one embodiment of a multi-region light scattering element with asymmetric particles substantially aligned and optically coupled to a opaque pattern that is optically coupled to a substrate with a hardcoat.

FIG. 10 illustrates another embodiment of this invention of a multi-region light scattering element with a region containing asymmetric light scattering particles between a region containing transparent regions and opaque regions and a substrate with a hardcoat. A patterned region 1003 containing transparent regions 1002 and opaque regions 1003 is optically coupled to a host matrix material 1006 having a refractive index $n_{h1}$ contains light scattering particles 1004 and 1005 having a refractive index $n_{p1}$. The first light scattering particles 1004 are asymmetric, and aligned substantially in the x direction within the regions and parallel to the alignment of the second light scattering particles 1005 in the second region also aligned in the x direction. A substrate 1007 with a hardcoating 1008 is optically coupled to the host matrix material 1006. The asymmetric shape of the particles scatters light to direct it into the horizontal, vertical or other desired direction. In the embodiment illustrated in FIG. 10, there is no interface between the light scattering regions. The host matrix material is the same for the regions containing dispersed particles and the central region without particles. This reduces undesirable backscattering in the multi-region light scattering element due to reflections from the refractive index differences at the interfacial boundaries. In order to remove the internal reflections, the transparent regions 1002 between the opaque regions 1001 is chosen to have the same refractive index, or very close to the same refractive index as the host matrix material 1006.

The substrate material may contain tints, dyes, pigments or light absorbing particles to provide contrast enhancement as is known in the art. The substrate material may be made of the same host matrix material to eliminate interfacial reflections or a different material of with a substantially similar refractive index. For example, the substrate could be a non-scattering region of host matrix material that is extruded simultaneously with the light scattering regions. It may have additional light scattering particles or features. The substrate may have surface relief features to provide anti-glare or anti-reflection coatings or features. This substrate should be sufficiently thick to provide an acceptable level of rigidity to provide protection, flatness and display system integration.

Figure 11:
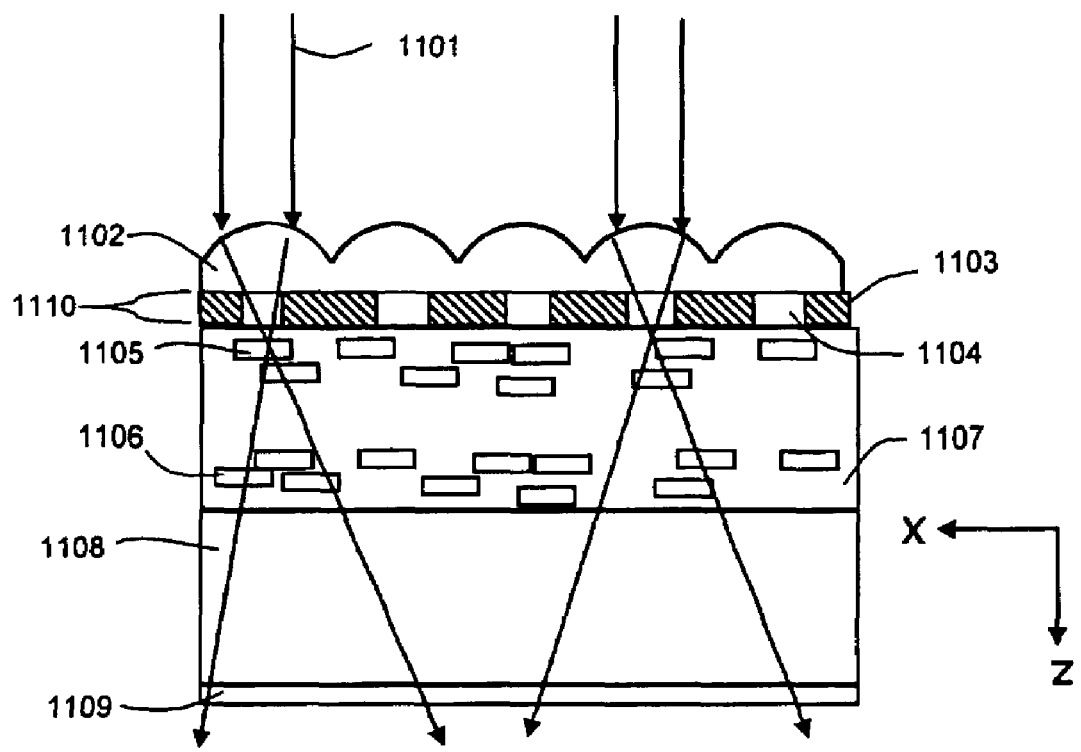
FIG. 11 is a schematic cross-sectional side view of one embodiment of a projection screen assembly with a black stripe-lenticular lens configuration optically coupled to a multi-region light scattering element with asymmetric particles substantially aligned that is optically coupled to a substrate with a hardcoat.

The multi-region light scattering element described in the previous paragraph may be combined with a lenticular lens to create a projection screen assembly as illustrated in FIG. 11. FIG. 11 illustrates a multi-region light scattering element of the invention having two regions containing asymmetric particles spaced apart by a non-scattering region and optically coupled to a substrate with a hardcoat and a black stripe-lenticular lens combination. Light 1101 from the projector is focused by the lenticular lens array 1102 through the clear apertures 1104 between the opaque regions 1103 in the patterned region 1110. The light is scattered by the first region of particles 1105 aligned in the x direction, travels through a non-scattering region 1107 of host matrix material and is further scattered by a second region of particles 1106 aligned in the x direction. The light then passes through the substrate 1108 with the hardcoating 1109 that is optically coupled to the host matrix material 1107. This projection screen provides high resolution, low speckle and contrast enhancement. The contrast enhancement may also be a beaded screen type, microlens array type, or total internal reflection type wherein one or more of the scattering elements contains asymmetric particles. The particles in each of the regions may be aligned in the x or y directions, or they may be at an angle $\theta$ with respect to the x or y axis such that 0 degrees $\leq \theta \leq$ 90 degrees.

Figure 12:
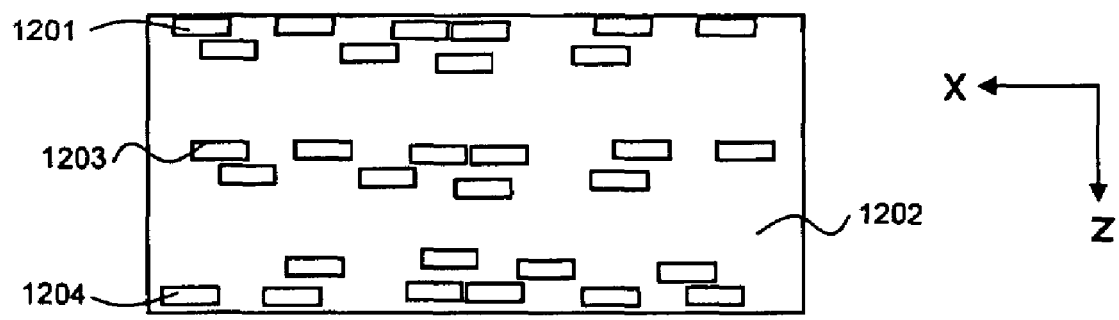
FIG. 12 is a schematic cross-sectional side view of one embodiment of a multi-region light scattering element wherein three asymmetric light scattering regions are separated by a non-scattering regions of the same host matrix material.

FIG. 12 illustrates a multi-region light scattering element of the invention where three light scattering regions of asymmetric particles are separated by a non-scattering regions in order to achieve a desired level of asymmetric diffusion and reduced speckle contrast. First light scattering particles 1201 are oriented with their major axis in the x direction within the host matrix material 1202. Similarly, light scattering particles 1203 and 1204 are aligned with their major axis aligned in the x direction and all three regions of particles are separated by non-scattering regions of host matrix material 1202. More than three light scattering regions may be used with different materials for the particles or host matrix material regions such that the desired angle of view, speckle contrast and resolution characteristics are achieved. The particles in each of the regions may be aligned in the x or y directions, or they may be at an angle $\theta$ with respect to the x or y axis such that 0 degrees $\leq \theta \leq$ 90 degrees.

Symmetric Particles

More than one type of particle may be used within a light scattering region or in different regions such in order to achieve a desired level of diffusion. The regions may consist of asymmetric particles in a host matrix material, symmetric particles in a host matrix material, a combination of asymmetric and symmetric particles in a host matrix material, or a substantially non-scattering region without particles.

The size and shape of the substantially symmetric particles may vary with the average sizes being not less than 2µ to not more than 100µ. In one embodiment, the regions incorporating light scattering particles are in a host matrix material that is the same material as the non-scattering region. By using one host matrix material with light scattering regions and non-scattering regions, the interfacial reflections are removed.

Figure 13:
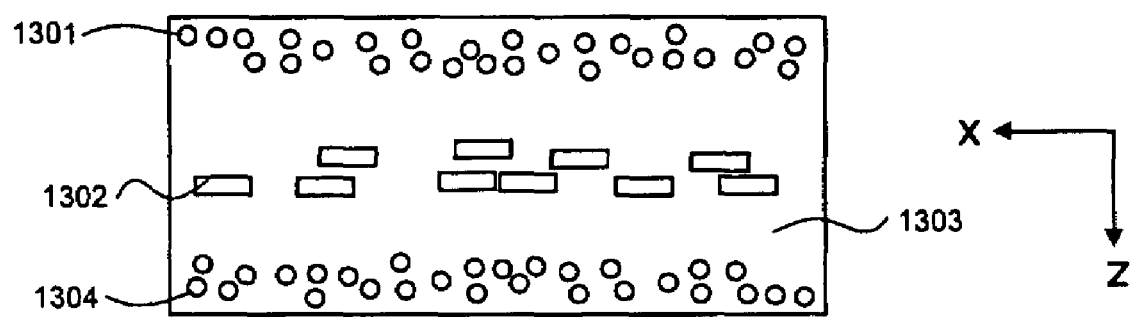
FIG. 13 is a schematic cross-sectional side view of one embodiment of a multi-region light scattering element wherein an asymmetric light scattering region is separated from two symmetric light scattering regions by non-scattering regions of the same host matrix material.

FIG. 13 illustrates an embodiment of the invention where one region of asymmetric particles is located between two regions of symmetric particles with all of the light scattering regions separated by non-scattering regions. Symmetric particles 1301 in the first light scattering region within the host matrix material 1303 are separated from asymmetric light scattering particles 1302 aligned with their major axis in the x direction by a non-scattering region of the host matrix material 1303. A third light scattering region containing symmetric light scattering particles 1304 is separated by a non-scattering region of host matrix material 1303. Symmetric and asymmetric particles may be combined within the screen element in different or the same region in order to precisely control the scattering angles and the speckle reduction. The symmetric particles in the light scattering regions can increase the light scattering in both the x and y directions for displays requiring wider angles of view.

Fine Particles

Particles that are significantly smaller than the wavelength of light may be added to one or more of the regions to alter the effective refractive index. In one embodiment, the size of the particles are less than $\frac{1}{10}^{th}$ the wavelength of light. In a preferred embodiment, the size of the particles are less than $\frac{1}{20}^{th}$ the wavelength of light of interest such that significant additional scattering (forward or backward) does not take place. These particles may be symmetric, asymmetric, or random in shape. For example, very fine particles of titanium dioxide may be added to a material to increase the effective refractive index of the material. The effective refractive index change can adjust the scattering properties of the material, refractive properties, and the interfacial reflections.

Figure 14:
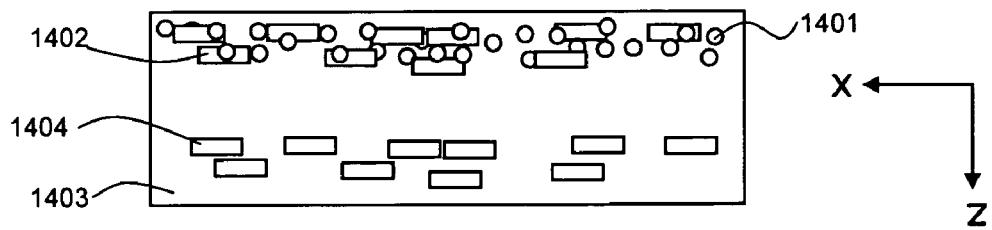
FIG. 14 is a schematic cross-sectional side view of one embodiment of a multi-region light scattering element wherein a light scattering region with symmetric and asymmetric light scattering particles is separated from an asymmetric light scattering region by a non-scattering region of the same host matrix material.

FIG. 14 illustrates an embodiment of this invention where asymmetric particles and substantially symmetric particles are located within the same region. Symmetric particles 1401 and asymmetric particles 1402 aligned with their major axis in the x direction are located in the same region within the host matrix material 1403. This region is separated from an asymmetric light scattering region containing asymmetric particles 1404 aligned with their major axis in the x direction by the host matrix material 1403. More than one region may contain asymmetric and substantially symmetric particles in order to achieve a desired level of diffusion and reduced speckle.

Figure 15:
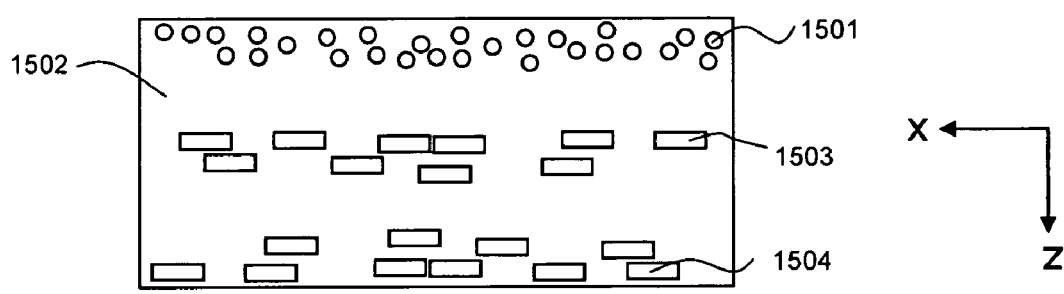
FIG. 15 is a schematic cross-sectional side view of one embodiment of a multi-region light scattering element wherein an asymmetric light scattering region is separated from a symmetric light scattering region and an additional asymmetric light scattering region by non-scattering regions of the same host matrix material.

FIG. 15 illustrates an embodiment of this invention of a multi-region light scattering element wherein more than one region of asymmetric particles and a region of substantially symmetric particles are used to create a multi-region light scattering element. Symmetric particles 1501 in the first light scattering region within the host matrix material 1303 are separated from asymmetric light scattering particles 1503 aligned with their major axis in the x direction by a non-scattering region of the host matrix material 1502. A third light scattering region containing asymmetric light scattering particles 1504 with their major axis aligned in the x direction is separated by a non-scattering region of host matrix material 1502. Further variations and combinations of regions with asymmetric and substantially symmetric particles can be envisioned and are included within the scope of this invention.

The Substantially Non-Scattering Region

By separating one or more of the light scattering regions by a substantially non-scattering region, the speckle contrast of the multi-region light scattering element is reduced. The amount of scattering for weakly scattering element can be measured by using a haze meter such as described in the ASTM D1003 standard. In one embodiment of this invention, the substantially non-scattering region has an ASTM D1003 haze value of less than 10%. In a more preferred embodiment, the haze value is less than 4%. The substantially non-scattering region may be made of similar material as the host matrix material in the light scattering regions, or it may be a different material. In one embodiment, the refractive index difference between the substantially non-scattering region and the host matrix material region is less than 0.1. In a more preferred embodiment, the refractive index difference between the substantially non-scattering region and the host matrix material region may be less than 0.09, 0.08, 0.07, 0.06, or 0.05. The thickness of one or more of the substantially non-scattering regions between two light scattering regions affects the speckle contrast. In one embodiment of this invention the thickness of the substantially non-scattering region less than 10 mm. In another embodiment, the thickness may be less than 9, 8, 7, 6 or 5 mm. In another embodiment, the thickness may be less than 3 mm. In a more preferred embodiment, the thickness of the substantially non-scattering region is less than 2 mm.

Regions Containing Optically Anisotropic Particles

Figure 16:
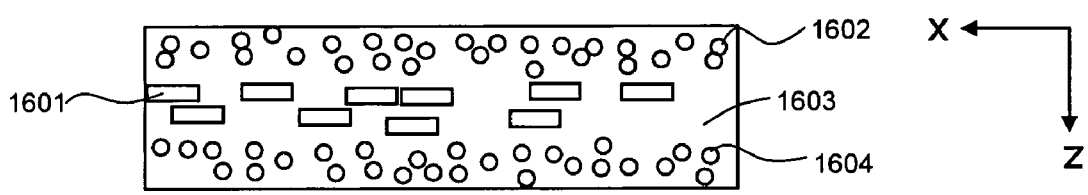
FIG. 16 is a schematic cross-sectional side view of one embodiment of a multi-region light scattering element wherein light scattering regions are separated by a substantially non-scattering region with substantially planar particles in the same host matrix material.

Many projection systems use polarization based light valves such as LCD's. The speckle contrast of light substantially polarized in one direction will be higher than that of un-polarized light for equivalent systems. The speckle contrast can be reduced by spacing apart the scattering elements and also by introducing optically anisotropic materials in the optical path of the polarized light such that the polarization state of neighboring light rays incident on a light scattering region have a different phase or orientation with respect to each other. FIG. 16 illustrates one embodiment where the light scattering regions are spaced apart by a region containing particles that are optically anisotropic, such that the refractive index is substantially different than that of the host matrix material in at least one of the x, y, or z directions. Asymmetric particles 1602 aligned with their major axis in the y direction are separated from a second region containing asymmetric particles 1604 aligned with their major axis in the y direction by a region containing anisotropic particles 1601. All of the particles are dispersed in a host matrix material 1603. The anisotropic particles may be used within or near light one or more light scattering regions containing symmetric or asymmetric particles. In a preferred embodiment, the anisotropic particles have a refractive index $n_{p3x}$, $n_{p3y}$, $n_{p3z}$ in a host matrix material $n_{h3}$ such that $n_{h3} \neq n_{p3x}$, or $n_{h3} \neq n_{p3y}$ or $n_{h3} \neq n_{p3z}$ and the speckle contrast is reduced. The optical anisotropy may be from the spacing of unit molecules in a crystal, a collection of such crystals, long molecules with atomic dipoles arranged in long chains, a two phase system with long or flat particles in a region with a different index of refraction in one or more directions, or stress or strain induced birefringence. The optical anisotropy may be in the form of circular birefringence or optically active materials. In a preferred embodiment, the optically anisotropic region depolarizes the light and reduces the speckle contrast.

In a further embodiment, the optically anisotropic regions or particles may scatter the light in a multi-region light scattering element in a symmetric or asymmetric light scattering profile. In a preferred embodiment, the forward scattering due to the anisotropic particles represents more than 50 percent of the light scattering of the element based on the full-width at half maximum angular intensity profile.

In a further embodiment, the optically anisotropic regions or particles desirably do not significantly scatter the incident light in the x, y, or z directions.

The size of the optically anisotropic particles may vary from several millimeters to 2µ in the longer dimension. In one embodiment, the optically anisotropic particles are elongated particles that have been stretched into fibrous-like particles that are strongly asymmetric in shape. In a preferred embodiment, the size of the optically anisotropic particles is less than 1 mm in the longer dimension. In a more preferred embodiment, the size of the particles is less than 200 microns in the longer dimension. These particles may be spheroidal, ellipsoidal, cube shaped, randomly shaped, or substantially planar in one or more directions.

The alignment of the axis of birefringence of the particles may be at an angle beta with respect to the x, y, or z axis such that the speckle contrast is reduced. The alignment of the anisotropic particles may also be substantially random. In a preferred embodiment, the particles have no substantial alignment such that the polarization state becomes effectively random across a localized region such that the effects of the polarization on speckle become averaged and the speckle contrast is reduced. In a preferred embodiment, optically active materials are used to locally rotate the state of polarization with the principle axes corresponding to circular polarization. The relative alignment may be left, right or at an angle beta resulting in polarized light exhibiting a relative phase delay with respect to light traversing the host matrix material. In a preferred embodiment, the alignment of the anisotropic particles is such that the speckle contrast is reduced and forward or back scattering due to the anisotropic particles is reduced.

For example, when used with a polarization based projection engine, light rays traveling through the birefringent material can have their phase advanced relative to light rays not traveling through the material. This reduces the contrast of the interference pattern seen as speckle.

In a further embodiment, the particles may be isotropic or anisotropic, with the host matrix material optically anisotropic such that the localized polarization state of incident light may vary. In a preferred embodiment, the host matrix material region contains optically isotropic, non-deformed material and the host matrix material consists of anisotropic material that exhibits strain induced birefringence.

In one embodiment, the optically anisotropic particles or regions are located between two or more light scattering regions. In a further embodiment, the optically anisotropic particles are located in a region also containing symmetric light scattering particles. In another embodiment, the optically anisotropic particles are located in a region also containing asymmetric light scattering particles. In another embodiment, the optically anisotropic particles are the asymmetric light scattering particles in one or more regions of a multi-region light scattering element.

The particles may be added to the host matrix material as optically active particles, or the optical anisotropy may be induced during the manufacture such as in the case of stress or strain induced birefringence. The optically anisotropic particles may be added to the host matrix material before coating or extruding or they may be created by stretching the element after coating or extruding. In a preferred embodiment, birefringent particles of polyester, such as PET for example, are added to the host matrix material before or during extrusion. Alternatively, the particles may achieve a stronger degree of birefringence by heating and stretching the multi-region light scattering element. In one embodiment, birefringent particles such as mica may be added to the host matrix material before forming or coating the light-scattering element or one of its regions. The regions of anisotropy can be referred to as particles independent of how they were introduced into the multi-region light scattering element. In one embodiment, optically anisotropic particles are added to the multi-region light scattering element such that they remain substantially constant in size and shape. In a further embodiment, a region of material can be processed to yield the desired anisotropic optical or physical characteristics of the dispersed phase material containing particulate or small localized regions appearing as particles.

Figure 17:
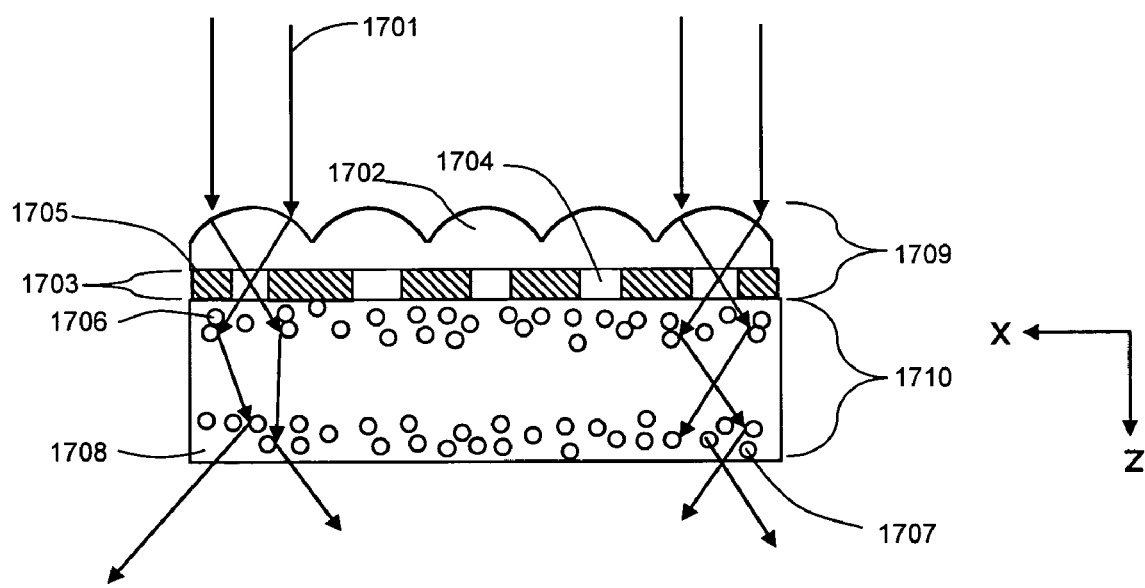
FIG. 17 is a schematic cross-sectional side view of one embodiment of a projection screen assembly containing a lenticular lens-black stripe element optically coupled to a multi-region light scattering element with asymmetric light scattering elements in two regions separated by a substantially non-scattering region containing planar particles.

FIG. 17 illustrates another embodiment of this invention of a multi-region light scattering element. Collimated light 1701 from a Fresnel lens passes through a lenticular lens 1702. The light is substantially focused through a patterned region 1703 containing transparent regions 1704 and opaque regions 1705. The patterned region 1703 is optically coupled to the lenticular lens 1702 and forms a contrast enhancing region 1709. This contrast enhancing region 1709 is coupled to a multi-region light scattering element 1710. The multi-region light scattering element 1710 contains asymmetric light scattering particles 1706 and 1707 aligned with their major axis in the y direction within and spaced apart by a substantially non-scattering host matrix material 1708. The multiple regions of asymmetric particles contributes to the reduction of the speckle and the high resolution. The contrast enhancement region 1709 containing the lenticular lens 1702 and patterned region 1703 provides improved ambient light absorption due to the opaque regions 1705, thus increasing the display contrast.

Figure 18:
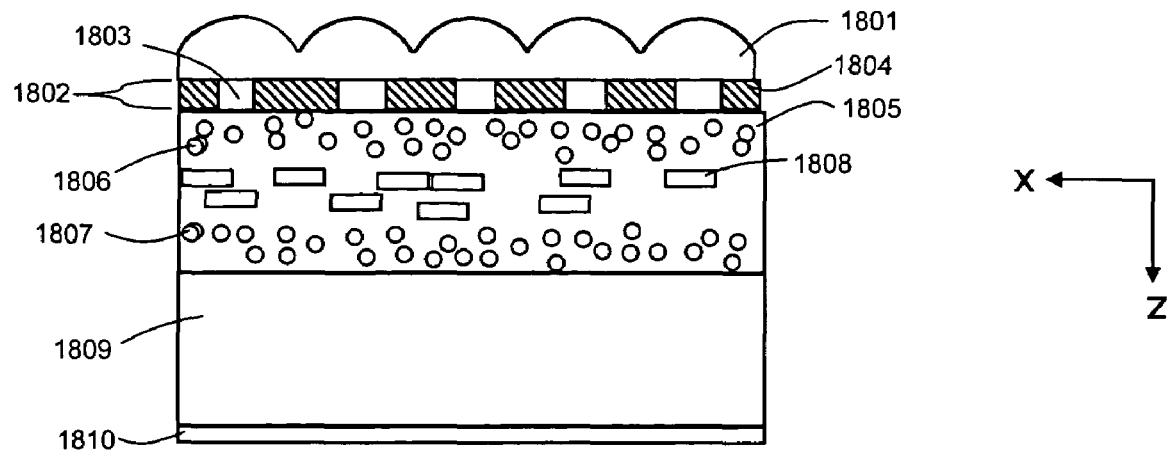
FIG. 18 is a schematic cross-sectional side view of one embodiment of a projection screen assembly containing a lenticular lens-black stripe element optically coupled to a multi-region light scattering element with asymmetric light scattering elements in two regions separated by a substantially non-scattering region containing planar particles that is optically coupled to a substrate with a hardcoat.

FIG. 18 illustrates another embodiment of this invention wherein a projection screen assembly is formed by optically coupling the screen element of FIG. 16 to a substrate suitable for a projection display that has a hardcoat on the opposite surface. A lenticular lens 1801 and a patterned region 1802 containing opaque regions 1804 and transparent regions 1803 form a contrast enhancement region. The patterned region 1802 is optically coupled to the lenticular lens 1801 and forms a contrast enhancing region 1803. This contrast enhancing region 1709 is optically coupled to a multi-region light scattering element 1812. The multi-region light scattering element 1812 contains asymmetric light scattering particles 1806 and 1807 aligned with their major axis in the y direction within and spaced apart by a region containing anisotropic particles 1808. The particles 1806, 1807 and 1808 are within a substantially non-scattering host matrix material 1805. The multi-region light scattering element 1812 is optically coupled to a substrate 1809 with a hardcoating 1810. The multiple regions of asymmetric particles contributes to the reduction of the speckle and the high resolution. The anisotropic particles 1808 and the spacing between the two asymmetric regions contribute to the reduction in speckle contrast. The contrast enhancement region 1811 containing the lenticular lens 1801 and patterned region 1802 provides improved ambient light absorption due to the opaque regions 1804, thus increasing the display contrast. In one embodiment, the substrate is an additional non-scattering region extruded during the manufacturing process. It may also be a cast or separately extruded material wherein upon which the multi-phase screen element my be optically coupled. The substrate material may contain tints, dyes, pigments or light absorbing particles to provide contrast enhancement. The substrate material may be made of the same host matrix material to eliminate interfacial reflections or a different material with a substantially similar refractive index. For example, the substrate could be a non-scattering region of host matrix material that is extruded simultaneously with the light scattering regions. This substrate should be sufficiently thick to provide an acceptable level of rigidity to provide protection, flatness and display system integration.

The multi-region light scattering element could be used in a screen assembly in a projection display system. Projection displays can be front or rear projection systems and generally comprise a light source, a light valve and a screen. Light valve systems include e-beam addressed light valves, cathode ray tubes, light amplifiers, liquid crystal light valves, micro-electromechanical systems (MEMS), reflective and transmissive light valves. Light valves modulate the light such that the intensity (or color) of the light is modulated in a region on the screen corresponding to a pixel. Liquid crystal based light valves include high-temperature polysilicon (HTPS), liquid crystal on silicon (LCOS), polymer dispersed liquid crystal, PDLC and other technologies known in the art for light valves based on liquid crystal material. Examples MEMS include Digital Micromirror Device from Texas Instruments, Grating Light Valve from Sony, and other similar systems known in the art. Most systems use projection lenses to magnify the image, however, some systems use the light valve directly to create a projection display where the image is the same size as the light valve. Instead of modulating the light by an external means, such as with a light valve, the light source can be modulated directly in a scanning system or in the case of an array of light emitting sources. Some projection systems use a laser or led as the light source and the light is scanned across the screen to generate an image. The scanning system can be rotating polygonal mirrors, uniaxial or biaxial MEMSs devices, liquid crystal based scanners, acousto-optic scanners and other scanning systems known in the art. Lenses may be used to magnify or projection the image. An array of light emitting sources may also be used as an image source that can be projected onto the screen assembly in a projection display system. Using a multi-region light scattering element can provide increased contrast, low speckle, and high resolution and gain in a projection display system.

Figure 19:
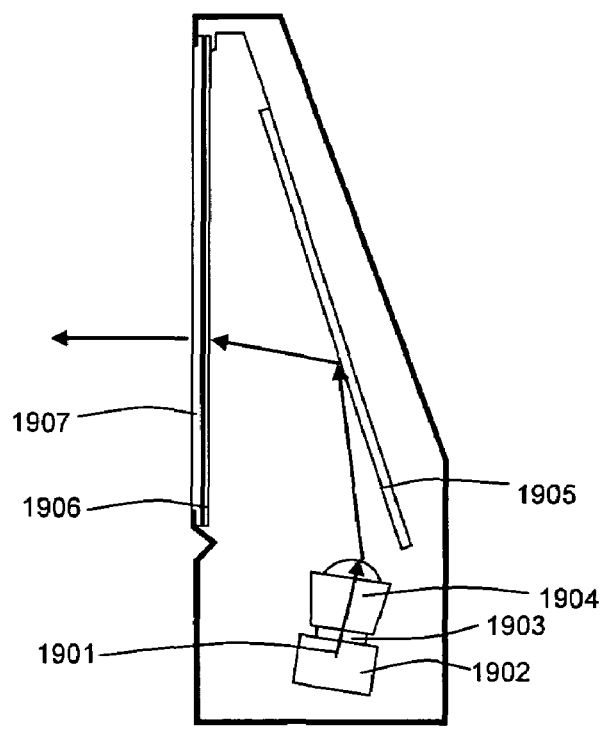
FIG. 19 is a schematic cross-sectional side view of one embodiment of a projection display system containing a screen assembly with a multi-region light scattering element.

FIG. 19 illustrates an embodiment of a projection system using a screen assembly containing a multi-region light scattering element. Light 1901 from a lamp 1902 is directed through a liquid crystal based light valve 1903 and into a projection lens 1904. This light reflects off of a mirror 1905 and into the a Fresnel lens 1906 and into a screen assembly 1907 containing a multi-region light scattering element.

In a preferred embodiment, light absorbing material such as particles, tints or dyes is located within the host matrix material. In a further embodiment, the light absorbing material is located within one or more of the light scattering regions. In a preferred embodiment, the light absorbing material is located within the particles or phases contributing to the asymmetric or symmetric light scattering properties of the element.

Typical characteristics of projection screens include the ability for the screen to be self-supporting. This can be achieved by using a substrate material that is typically thicker than other elements. Alternatively, a thick region of polymer could be extruded such that it is sufficiently rigid to act as a substrate. Generally, the larger the size of the screen, the thicker the substrate or support will need to be. Other methods for projection screen assembly include securely fastening the screen material to the support or frame such that the screen is supported and substantially planar. Suitable substrate materials include polymers, glass and other materials that are substantially transparent in the visible wavelength spectrum. Tints, pigments, dyes or light absorbing particles can be added to the substrate or thick region to provide ambient light absorption and an increase in contrast. Hardcoats of different types can be applied to the substrate. Additionally anti-reflection coatings or features may be applied in conjunction with hardcoats. These include moth-eye or similar relief structures and destructive interference multilayer coatings, films or structures.

Preferred embodiments of the present invention are illustrated in the following Example(s). The following examples are given for the purpose of illustrating the invention, but not for limiting the scope or spirit of the invention.

EXAMPLE 1

A multi-region light scattering element, in accordance with the present invention, with asymmetric light scattering features, results in reduced speckle contrast and increased resolution relative to a multiple layer symmetric diffuser. By using two volumetric, asymmetric light scattering regions aligned perpendicular to each other and separated by a substantially non-scattering region, the light is scattered in the x-z plane and then in the y-z plane. The resolution is therefore significantly higher than two symmetric diffusers in both the x-z and y-z plane.

Sample S1a, a symmetric diffuser with a FWHM of 16 degrees by 16 degrees and gain of 19 was created by dispersing 30% by weight polyethylene particles of refractive index 1.51 within a matrix material of polyester of refractive index 1.568. A multi-layer symmetric scattering element was created by laminating two samples of this symmetric diffuser to either side of a 1.5 mm polycarbonate substrate with a refractive index of 1.587 using a OCAV3 optically clear pressure sensitive adhesive from Intelicoat with a refractive index of 1.48. The resulting multiple layer scattering screen (Sample S1b) had a light scattering intensity profile with a FWHM of 26 degrees by 26 degrees with a gain of 6. The resolution of this multiple layer scattering screen was measured by illuminating a U.S. Air Force Test Pattern (Edmund Industrial Optics) with collimated light. The screen is in close contact with the pattern such that the horizontal and vertical resolution bars are seen on the screen. On the opposite side of the screen from the diffuser was a CCD camera attached to microscope. Images of the horizontal and vertical line patterns were captured by a computer and analyzed. Multiple horizontal and vertical intensity line scan measurements were averaged resulting in an average light intensity pattern corresponding to the line pairs in the test pattern. From this, the contrast modulation was determined. The resolution for a 20% contrast modulation was approximately 3 line pairs per millimeter in the horizontal and vertical directions. The speckle contrast was measured by illuminating the screen with a fiber optic light guide and analyzing the captured image with computer software. The speckle contrast of S1b was measured to be 5%.

Sample A1a, an asymmetric diffuser with a FWHM of 9 degrees by 5 degrees and Gain of 30 was created by dispersing 30% by weight polyethylene particles with a refractive index of 1.51 within a matrix material of polyester with a refractive index of 1.568 and stretching the material as described in U.S. Pat. No. 5,932,342. A multi-region asymmetric scattering element was created by laminating two samples of this symmetric diffuser to either side of a 1.5 mm polycarbonate substrate with a refractive index of 1.587 using a OCAV3 optically clear pressure sensitive adhesive from Intelicoat with a refractive index of 1.48. . . . The resulting multi-region scattering screen (Sample A1b) had a light scattering intensity profile with a FWHM of 25 degrees by 25 degrees with a gain of 5.3. The resolution of this multiple layer scattering screen was measured by illuminating the USAF Test Pattern with collimated light. The screen is in close contact with the pattern such that the horizontal and vertical resolution bars are seen on the screen. On the opposite side of the screen from the diffuser was a CCD camera attached to microscope. Images of the horizontal and vertical line patterns were captured by a computer and analyzed. Multiple horizontal and vertical intensity line scan measurements were averaged resulting in an average light intensity pattern corresponding to the line pairs in the test pattern. From this, the contrast modulation was determined. The resolution for a 20% modulation depth was 9 line pairs per millimeter in the horizontal and vertical directions. The speckle contrast was measured by illuminating the screen with a fiber optic light guide and analyzing the captured image with computer software. The speckle contrast of A1b was measured to be 6%.

The speckle, resolution and angle of view results are shown in Table 1. As is seen from the Table, the resulting diffusion angles (FWHM) were approximately equal, the gain was high and similar, and both of the configurations had essentially the same low speckle contrast. However, the horizontal and vertical resolutions were approximately three times higher for the light scattering element composed of two crossed asymmetric diffusers.

TABLE 1

| Sample # | FWHM Horizontal (Degrees) | FWHM Vertical (Degrees) | Gain | Resolution (Avg line pairs/mm at 20% deviation) | Speckle Contrast (%) |
|---|---|---|---|---|---|
| S1a | 16 | 16 | 19 | | |
| S1b | 26 | 26 | 6 | 3 | 5 |
| A1a | 9 | 5 | 30 | | |
| A1b | 25 | 25 | 5.3 | 9 | 6 |
| S2a | 29 | 29 | 5.6 | | |
| S2b | 42 | 42 | 2.4 | 2 | 3 |
| A2a | 33 | 6 | 20 | | |
| A2b | 42 | 42 | 2.6 | 7 | 3 |

EXAMPLE 2

Sample S2a, a symmetric diffuser with a FWHM of 29 degrees by 29 degrees and gain of 5.6 was created by dispersing 30% by weight polyethylene particles within a matrix material of polyester. A multi-layer symmetric scattering element was created by laminating two samples of this symmetric diffuser to either side of a 1.5 mm polycarbonate substrate using an index-matched pressure sensitive adhesive. The resulting multiple layer scattering screen (Sample S2b) had a light scattering intensity profile with a FWHM of 42 degrees by 42 degrees with a gain of 2.4. The resolution of this multiple layer scattering screen was measured by illuminating the USAF Test Pattern with collimated light. The screen is in close contact with the pattern such that the horizontal and vertical resolution bars are seen on the screen. On the opposite side of the screen from the diffuser was a CCD camera attached to microscope. Images of the horizontal and vertical line patterns were captured by a computer and analyzed. Multiple horizontal and vertical intensity line scan measurements were averaged resulting in an average light intensity pattern corresponding to the line pairs in the test pattern. From this, the modulation depth was determined. The resolution for a 20% modulation depth was approximately 2 line pairs per millimeter in the horizontal and vertical directions. The results are shown in Table 1, above.

Sample A2a, an asymmetric diffuser with a FWHM of 33 degrees by 6 degrees and gain of 30 was created by dispersing 30% by weight polyethylene particles within a matrix material of polyester and stretching the material as described in U.S. Pat. No. 5,932,342. A multi-region asymmetric scattering element was created by laminating two samples of this asymmetric diffuser to either side of a 1.5 mm polycarbonate substrate using an index-matched pressure sensitive adhesive with their major axes of diffusion oriented perpendicular to each other. The resulting multi-region scattering screen (Sample A2b) had a light scattering intensity profile with a FWHM of 42 degrees by 42 degrees with a gain of 2.4. The resolution of this multiple layer scattering screen was measured by illuminating the USAF Test Pattern with collimated light. The screen is in close contact with the pattern such that the horizontal and vertical resolution bars are seen on the screen. On the opposite side of the screen from the diffuser was a CCD camera attached to a microscope. Images of the horizontal and vertical line patterns were captured by a computer and analyzed. Multiple horizontal and vertical intensity line scan measurements were averaged resulting in an average light intensity pattern corresponding to the line pairs in the test pattern. From this, the contrast modulation was determined. The resolution for a 20% contrast modulation was 7 line pairs per millimeter in the horizontal and vertical directions.

The speckle, resolution and angle of view results are shown in Table 1. As can be seen, the resulting diffusion angles (FWHM) were approximately equal, the gain was high and similar, and both of the configurations had essentially the same low speckle contrast. However, the horizontal and vertical resolutions were approximately three times higher for the light scattering element composed of two crossed asymmetric diffusers.

EXAMPLE 3

A projection screen, in accordance with the present invention, can be produced to have reduced speckle. An asymmetric diffuser with a FWHM of 33 degrees by 6 degrees and gain of 30 was created by dispersing 30% by weight polyethylene particles within a matrix material of polyester and stretching the material as described in U.S. Pat. No. 5,932,342. A multi-region asymmetric scattering element can be created by laminating two samples of this asymmetric diffuser with their major axes of diffusion oriented perpendicular to each other to either side of a 1.5 mm acrylic substrate containing dispersed birefringent mica particles. The resulting diffuser will have an increased resolution and reduced speckle contrast relative to a comparable multilayer symmetric diffuser.

EXAMPLE 4

A projection screen, in accordance with the present invention, can be produced to have high resolution and low speckle. An asymmetric diffuser with a FWHM of 33 degrees by 6 degrees and gain of 30 was created by dispersing 30% by weight polyethylene particles within a matrix material of polyester and stretching the material as described in U.S. Pat. No. 5,932,342. A multi-region asymmetric scattering element can be created by laminating two samples of this asymmetric diffuser with their major axes of diffusion oriented perpendicular to each other to either side of a 1.5 mm acrylic substrate. The resulting multi-region diffuser will have an increased resolution and reduced speckle contrast relative to a comparable multilayer symmetric diffuser. This can be laminated using a pressure sensitive adhesive such as OCAV3 from Intelicoat to a black stripe region laminated to a lenticular lens array. The black stripe region can be Cromalin photopolymer from DuPont that has been laminated to and exposed through a lenticular lens using OCAV3 from Intelicoat and collimated UV exposure. Toner is applied to the Cromalin to create a black stripe region registered with the lenticules. The screen resulting from laminating the multi-region asymmetric diffuser to the lenticular lens and black stripe layer has high gain, high resolution with low speckle contrast.

Equivalents

Those skilled in the art will recognize, or be able to ascertain using no more than routine experimentation, numerous equivalents to the specific procedures described herein. Such equivalents are considered to be within the scope of the invention. Various substitutions, alterations, and modifications may be made to the invention without departing from the spirit and scope of the invention. Other aspects, advantages, and modifications are within the scope of the invention. The contents of all references, issued patents, and published patent applications cited throughout this application are hereby incorporated by reference. The appropriate components, processes, and methods of those patents, applications and other documents may be selected for the invention and embodiments thereof.

What is claimed is:

1. A multi-region light scattering element containing
a) a first light scattering region having asymmetrically shaped light scattering features;
b) a second light scattering region; and
c) a third, substantially non-scattering, region disposed between the first and second light scattering regions, wherein the multi-region light scattering element has an optical gain G, such that G>1 when measured at an angle normal to the element with substantially collimated light illumination.

2. The multi-region light scattering element of claim 1, wherein the second light scattering region comprises asymmetrically shaped light scattering features.

3. The multi-region light scattering element of claim 2, wherein the asymmetrically shaped light scattering features are asymmetrically shaped particles, wherein the alignment of the asymmetrically shaped light scattering features in the first and second light scattering regions are at an angle $\theta$ with respect to each other with $0° \leq \theta \leq 90°$.

4. The multi-region light scattering element of claim 2, wherein the second light scattering region comprises a matrix material and asymmetrically shaped particles within the matrix material.

5. The multi-region light scattering element of claim 4, wherein one or both of the light scattering regions of the element comprises a matrix material and symmetrically shaped particles within the matrix material that symmetrically scatter incident light.

6. The multi-region light scattering element of claim 1, wherein said light scattering features comprises a matrix material and asymmetrically shaped particles within the matrix material.

7. The multi-region light scattering element of claim 1, wherein the asymmetrically shaped light scattering feature is a surface relief structure selected from the group consisting of a lenticular lens, a fresnel lens, a microlens array, a holographic pattern, a prismatic lens, a diffractive structure, or a refractive structure.

8. The multi-region light scattering element of claim 7, wherein the second light scattering region comprises a matrix material and asymmetrically shaped particles within the matrix material.

9. The multi-region light scattering element of claim 8, wherein the second light scattering region comprises a matrix material and asymmetrically shaped particles within the matrix material, wherein the alignment of the asymmetrically shaped light scattering features in the first and second light scattering regions are at an angle θ with respect to each other with $0° \leq \theta \leq 90°$.

10. The multi-region light scattering element of claim 9, wherein the second light scattering region contains asymmetrically shaped light scattering features.

11. The multi-region light scattering element of claim 10, wherein the first and second light scattering regions comprise a matrix material and asymmetrically shaped particles within the matrix material, wherein the alignment of the asymmetrically shaped particles within each of the first and second light scattering regions are substantially parallel and the alignment of the particles between the regions are at an angle θ with respect to each other with $0° \leq \theta \leq 90°$.

12. The multi-region light scattering element of claim 10, the first and second light scattering regions comprise a matrix material and asymmetrically shaped particles within the matrix material, wherein the alignment of the asymmetrically shaped particles within each of the first and second light scattering regions are substantially parallel and the alignment of the particles between the regions are at an angle θ with respect to each other with $80° \leq \theta \leq 90°$.

13. The multi-region light scattering element of claim 1, wherein the substantially non-scattering region has a refractive index $n_{s1}$ and comprises a matrix material and dispersed particles within the matrix material having a refractive index $n_{p2}$ such that $|n_{s1} - n_{p2}| \geq 0.001$ in at least one of the x, y, or z directions.

14. The multi-region light scattering element of claim 13, wherein the asymmetrically shaped light scattering features are asymmetrically shaped light scattering particles contained within the matrix material.

15. A screen suitable for use in a rear projection system, comprising the multi-region light scattering element of claim 1.

16. The screen of claim 15, further comprising at least one contrast enhancing feature.

17. The screen of claim 16, wherein the contrast enhancing element is selected from the group consisting of light absorbing particles, pigments, or dyes in one or more of the substrates, adhesive layers, coatings, continuous phase materials, dispersed phase materials, lens arrays, conformal coatings, or a separate region.

18. The screen of claim 15, wherein the contrast enhancing feature is selected from the group consisting of a lenticular lens with a black stripe region; a beaded screen with a light absorbing region; total internal reflection features with a light absorbing region; a microlens array with light absorbing region; or an absorptive polarizer.

19. The screen of claim 15, further comprising an anti-glare matte surface; an anti-reflection coating or film; or a hardcoat.

20. The screen assembly of claim 15, further comprising an image quality enhancing and maintaining components selected from the group consisting of an anti-glare matte surface, an anti-reflection coating or film, or a hardcoat.

21. A method of displaying an image, comprising the step of projecting an image on a screen of claim 15.

22. A projection display system comprising the screen assembly of claim 15, a light source and a light valve.

23. The projection display system of claim 22 wherein the light valve is one of a transmissive liquid crystal light valve, a reflective liquid crystal light valve, a micro-mirror based light modulator.

24. A projection display system comprising the screen assembly of claim 15, a light source and a scanning system.

25. A projection display system of claim 24 wherein the light source is one of a laser or light-emmitting diode.

26. A projection display system comprising the screen assembly of claim 15, and an array of light emitting sources.

27. A multi-region light scattering element comprising three or more light scattering regions, wherein at least of said one light scattering regions comprises asymmetric light scattering features with at least two of the light scattering regions separated by a substantially non-scattering region, The wherein the element has an optical gain, G, such that G>1 when measured at an angle normal to the element with substantially collimated light illumination.

* * * * *